United States Patent [19]

Antoniades et al.

[11] Patent Number: 5,825,517
[45] Date of Patent: Oct. 20, 1998

[54] PARAMETRIC WAVELENGTH INTERCHANGING CROSS-CONNECT

[75] Inventors: Neophytos Andreas Antoniades, Long Island City, N.Y.; Krishna Bala, Eatontown, N.J.; Georgios Nicos Ellinas, New York, N.Y.; Sung-Joo Yoo, Long Branch, N.J.

[73] Assignee: Tellium, Inc., Oceanport, N.J.

[21] Appl. No.: 568,037

[22] Filed: Dec. 6, 1995

[51] Int. Cl.⁶ .................................................. H04J 14/00
[52] U.S. Cl. .......................................... 359/117; 359/128
[58] Field of Search ................................... 359/117, 118, 359/120, 121, 123, 128, 139

[56] References Cited

U.S. PATENT DOCUMENTS

| | | | |
|---|---|---|---|
| 5,002,349 | 3/1991 | Cheung et al. | 350/96.13 |
| 5,194,977 | 3/1993 | Nishio | 359/123 |
| 5,359,617 | 10/1994 | Kano et al. | 372/45 |
| 5,369,514 | 11/1994 | Eilenberger et al. | 359/123 |
| 5,414,540 | 5/1995 | Patel et al. | 359/39 |
| 5,414,541 | 5/1995 | Patel et al. | 359/39 |
| 5,434,700 | 7/1995 | Yoo | 359/332 |
| 5,477,362 | 12/1995 | Okamoto et al. | 359/123 |
| 5,495,356 | 2/1996 | Sharony et al. | 359/123 |

FOREIGN PATENT DOCUMENTS

| | | | |
|---|---|---|---|
| 0313389 | 4/1989 | European Pat. Off. | 359/177 |
| 4008544 | 7/1991 | Germany | 359/117 |
| 8704886 | 8/1987 | WIPO | 359/117 |

OTHER PUBLICATIONS

Alexander et al, "A Precompetitive Consortium on Wide-Band All-Optical Networks," *Journal of Lightwave Technology*, vol. 11, No. 5/6, 1993, pp. 714–735.

Brackett et al., "A Scalable Multiwavelength Multihop Optical Network: A Proposal for Research on All-optical Networks," *Journal of Lightwave Technology*, vol. 11, No. 5/6, 1993, pp. 736–753.

Hinton, "An Introduction to Photonic Switching Fabrics," (Plenum, 1993), pp. 47–65.

Joel, Jr., "On Permutation Switching Networks," *Bell Systems Technical Journal*, vol. 47, No. 5, pp. 813–825, 1968.

Marcus, "Space–time Equivalents in Connecting Networks," *1970 International Conference on Communications*, San Francisco, Jun. 8–10, 1970, (70–CP–386–COM), pp. 35-25—35-31.

Opferman and Tsao–Wu, "On a Class of Rearrangeable Switching Networks; Part I: Control Algorithm," *Bell Systems Technical Journal*, vol. 50, 1971, pp. 1579–1600.

(List continued on next page.)

Primary Examiner—Rafael Bacares
Attorney, Agent, or Firm—Morgan, Lewis & Bockius LLP

[57] ABSTRACT

A wavelength-interchanging cross-connect for use as an optical switch within a wavelength-division multiplexing (WDM) communications network in which multiple optical carrier signals at different optical wavelengths are switched in an all-optical process according to their wavelength. The cross-connect of the invention further allows the optical wavelength of the signal being switched to be changed to another WDM wavelength. The cross-connect includes a series of multi-wavelength 2×2 spatial optical switches. One serial path is directly connected between the spatial switches. The other serial path leads through intermediate wavelength-interchanging modules that interchange the carrier wavelengths of at least one pair of signals. Preferably, the wavelength interchanging is performed by difference frequency generation relying on second-order non-linear susceptibilities and a pump signal providing parametric gain. The frequency of the pump signal is chosen to be the sum of the frequencies of whatever optical signals are to be interchanged, and more than one pair can simultaneously be interchanged. The placement of the pumping frequencies is determined by a design process using a modified version of a recursively designed Benes network. As a result, the wavelength-interchanging cross connect can be controlled by the well known looping algorithm known for Benes networks to be rearrangeably non-blocking.

27 Claims, 14 Drawing Sheets

OTHER PUBLICATIONS

Varma et al., "Rearrangeability of Multistage Shuffle/Exchange Networks," *IEEE Transactions on Communications*, vol. COM–36, 1988, pp. 1138–1147.

Way et al., "A Self–routing WDM High Capacity SONET Ring Network," *IEEE Photonics Technology Letters*, vol. 4, No. 4, Apr. 1992, pp. 402–405.

Yoo et al., "Quasi–phase Matched Second Harmonic Generation in AlGaAs Waveguides Prepared by Wafer–Bonding, Nonlinear Guided Waves and their Applications," *1995 Technical Digest Series*, vol. 6, Optical Society of America, pp. PD5–2, PD5–4.

Yoo et al, "Quasi–phase–matched Second–harmonic Generation in AlGaAs Waveguides with Periodic Domain Inversion Achieved by Wafer–bonding," *Applied Physics Letters*, vol. 66, 1995, pp. 341—3412.

Yoo et al., "Wavelength Conversation by Quasi–matched Difference Frequency Generation in AlGaAs Waveguide," *Optical Fiber Conference '95: Reader's Digest*, Paper PD14–2, San Diego, CA 1995.

PARAMETRIC WAVELENGTH INTERCHANGING CROSS-CONNECT

GOVERNMENT INTEREST

This invention was made with Government support under Agreement No. MDA-972-95-3-0027, awarded by ARPA. The Government has certain rights in the invention.

FIELD OF THE INVENTION

The invention generally relates to communications networks. In particular, the invention relates to optical communications networks utilizing wavelength division multiplexing and to components capable of converting the wavelength of an optical signal.

BACKGROUND ART

Communication networks, particularly the public networks spanning long distances, are increasingly utilizing optical fiber as the transmission medium. Optical fiber offers many advantages such as low loss, immunity to interference, but most importantly an extremely large bandwidth. To date, most communication networks have used optical fiber as a point-to-point replacement for electrical wire with electro-optical transmitters and receivers providing conversion to electrical signals at important points, e.g. switches, in the network. Because the net throughput is limited by the electronics, such an architecture does not effectively utilize the bandwidth of the fiber.

Wavelength-division multiplexing (WDM), as applied to optical communications, impresses several data signals upon respective optical carriers of different wavelengths. The optical signals are combined upon a single optical fiber at its transmitting end. At the receiving end of the optical fiber, the optical carriers are optically demultiplexed into beams each carrying a single data signal, and conventional optical detectors are dedicated to each of these beams. Although this simple WDM architecture increases the fiber throughput by the factor of the number of optical carriers, the nodes of the network become complex and expensive.

Recently, several concepts have been developed for an all-optical WDM network in which the nodes of the network can switch different ones of the WDM wavelength channels in different directions without ever converting the optical signals to electronic form. Two cooperative developmental efforts are described respectively by Brackett et al. in "A scalable multiwavelength multihop optical network: A proposal for research on all-optical networks," *Journal of Lightwave Technology*, vol. 11, no. 5/6, 1993, pp. 736–753 and by Alexander et al. in "A Precompetitive Consortium on Wide-Band All-Optical Networks," *Journal of Lightwave Technology*, vol. 11, no. 5/6, 1993, pp. 714–735. An example of an early version of these developmental systems is illustrated in FIG. 1. A transparent all-optical network 10 includes two wavelength-division multiplexing (WDM) switches 12, 14 which can selectively switch the wavelength-multiplexed optical signals in different directions dependent upon their wavelengths $\lambda_1$ through $\lambda_3$. The signals are not converted to electrical form at the switches 12, 14 but remain in optical form throughout. Several types of multi-wavelength spatial optical switches are known, examples of which are acousto-optical tunable filters of the general type disclosed by Chueng et al. in U.S. Pat. No. 5,002,349 and liquid-crystal switches of the type disclosed by Patel et al. in U.S. Pat. Nos. 5,414,840 and 5,414,841. Hinton describes a number of optically transparent switches in *An Introduction to Photonic Switching Fabrics*, (Plenum, 1993), pp. 47–65. For a small number of channels, it is possible to mechanically connect fiber between one optical port and a selected one of multiple other optical ports.

Various access nodes 16 through 24 are interconnected through the WDM switches 12, 14 of the transparent all-optical network 10. The destination access node of a signal leaving an originating access node is determined by the wavelength of its optical carrier. It is anticipated that the WDM switches 12, 14 will be reconfigured within times of the order of seconds and remain in a set configuration for minutes or even days. The reconfigurability allows the optical wavelengths to be reallocated to connecting different pairs of the access nodes 16–24. Such a switching of WDM signals is referred to as space switching even though the signals are switched in different directions with the directions being determined by the wavelength.

However, the number of discrete wavelength channels is limited. For example, a network of sufficient size requires amplification, which at the present time depends upon erbium-doped fiber amplifiers having an amplification bandwidth of about 40 nm. With a realistic optical channel spacing of about 4 nm in a moderately simple architecture, such a bandwidth can accommodate only about 10 optical channels. The exact numbers are subject to some adjustment and 20 optical channels are considered feasible, but it is clear that the number of wavelengths is severely limited. Hence, wavelength reuse will be required. In fact, the illustrated connectivity of the network 10 of FIG. 1 can already benefit from frequency reuse. If the A access node 16 desires to transmit to the C access node 20, no direct path exists. However, it could transmit the data signal to the B access node 18 on carrier wavelength $\lambda_1$, and the B access node 18 could retransmit the data signal to the C access node 20 on carrier wavelength $\lambda_2$. Nonetheless, such limited reuse is insufficient for a network intended to connect large numbers of users in a public network. More extensive wavelength reuse is required.

On a larger scale, one or more of the access nodes, for example the C access node 20, could simultaneously be connected to another transparent all-optical network 10' with additional access nodes attached to the second network 10'. This architecture allows the overall network to be scaled to very large, even worldwide, sizes. However, the scalability requires that the connecting access node 20 be able to translate the wavelength for the optical carrier of the data signal being transferred between the two all-optical networks to a wavelength dictated by the second network. That is, large WDM networks will require wavelength translation of a signal at many points in the network.

Thompson of the University of Pittsburgh and Hunter of the University of Strathclyde have prepared a technical paper "Elementary photonic switching modules in three divisions," to appear in *IEEE Journal of Selected Areas of Communications* in 1996. This work expands on ideas previously presented by Marcus in "Space-Time Equivalents in Connecting Networks," *Proceedings 1970 International Conference on Communications*, pp. 35.25–35.31. Thompson and Hunter generalize switching to three possible switching modes, namely, space, wavelength, and time. Time switching (time division multiple access or TDMA) is of no immediate concern here. Space switching is performed by the WDM switches 12 and 14 of FIG. 1. Wavelength switching can be performed by the access nodes, as described for the generalization of FIG. 1, when optical signals are switched between different optical carrier wavelengths, either within the immediate network or when being transferred to a neighboring network. In particular, Thompson and Hunter describe a 4×4 space/wavelength network shown in FIG. 2 having two input fibers 30, 32 each respectively bearing two wavelength channels $\lambda_1$, $\lambda_2$ or $\lambda'_1$, $\lambda'_2$, where the primed and unprimed channels have the same wavelength carriers but carry different data signals. These two input fibers are connected to three serially connected two-wavelength 2×2 switches 34, 36, and 38, also referred to as wavelength selective cross-connects (WSXCs).

Such switches exhibit two states for each of the two wavelengths. In one state, the bar state, the signals stay on the same paths while in the other or cross state the signals are interchanged between the two paths. However, by itself, a single such 2×2 wavelength selective switch 34, 36, 38 cannot combine two signals carried by the respective carriers $\lambda_1$, $\lambda'$, or $\lambda_2$, $\lambda'_2$ because both signals to be combined have the same carrier frequency so that they would interfere on the one output fiber on which they are conveyed, and the switch has no means of converting the wavelength of a signal. Besides, most elementary 2×2 wavelength selective switches intrinsically operate in the bar and cross states and thus cannot combine signals with the same carrier wavelength but can only interchange them or not interchange them between two paths.

However, Thompson and Hunter propose achieving the required wavelength shifting by having their switch further include 2 two-wavelength interchangers 40, 42 disposed on optical paths between successive 2×2 switches 34,36 and 36,38. If a data signal enters a wavelength interchanger 40 or 42 carried on the optical carrier wavelength $\lambda_1$, it leaves the wavelength interchanger on the optical carrier wavelength $\lambda_2$. Similarly, a signal entering at $\lambda_2$ leaves at $\lambda_1$. That is, the wavelength interchangers 40 and 42 interchange the carrier wavelengths for the two data signals. This element will at sometimes be referred to as a frequency interchanger since interchanging wavelengths and corresponding frequencies are equivalent. The final effect is a 2×2/2–$\lambda$ wavelength interchanging cross-connect (WIXC) in which any two data signals on a pair of duplexed inputs can be combined on either of a pair of different duplexed output wavelengths by use of frequency interchanging.

Thompson and Hunter constructed their 2×2/2–$\lambda$ wavelength interchanging cross-connect (WIXC) by basing their design on an equivalent to a 4×4 Benes network 48 shown in FIG. 3 in which the upper row of switches 50 represents the first carrier wavelength $\lambda_1$ and the lower row of switches 52 represents the second carrier wavelength $\lambda_2$. In this representation, the switches 50, 52 are assumed to be single-wavelength. The input and output ports are labeled by symbols $\lambda_i^{p_j}$, which represent the signal of carrier wavelength $\lambda_i$ appearing at spatial port $P_j$. We have realized that the networks of FIGS. 2 and 3 may be related through the characterization within the Benes network of a division between a $\lambda_1$-plane at the top including the upper switches 50 and a $\lambda_2$-plane at the bottom including the lower switches 52. Any passage of a signal through one of the wavelength interchangers 40, 42 in FIG. 2 translates that signal between $\lambda_1$ and $\lambda_2$ and is equivalent to a signal of uncharacterized wavelength traversing between the $\lambda_1$- and $\lambda_2$-planes of FIG. 3.

Thompson and Hunter derived their formalism in the context of a ladder of divisions, viz., time multiplexing, wavelength multiplexing, or space multiplexing, and the wavelength translation manifested in FIG. 3 causes a signal to slip from one division to another, for example, from $\lambda_1$ to $\lambda_2$. We, however, interpret the diagram of FIG. 3 as including a symmetry plane 53 located between the $\lambda_1$-plane for the upper switches 50 and the $\lambda_2$-plane for the lower switches 52. For reasons that will be explained later, the exact position of the symmetry plane 53 should be the average energy of the two optical carrier waves, that is, $$\omega_{sym} = \frac{\omega_1 + \omega_2}{2}, \tag{1}$$

where $\omega$ is the frequency of the light wave of wavelength $\lambda$.

Thompson and Hunter suggest two types of wavelength interchangers. The first is a regenerator in which a demultiplexer separates an optical signal at one wavelength from accompanying signals at other wavelengths and a photodetector detects the intensity of the single wavelength signal, that is, the envelope of the optical signal. The detected intensity is used to modulate a laser emitting at another wavelength. Such a wavelength interchanger is complex and defeats much of the purpose of an all-optical network. Furthermore, a regenerator is not transparent in the sense that it needs to be tailored to the signal format used in the optical channel. For WDM networks, it is greatly desired that the amplifiers and switching nodes be transparent so as to handle an optical signal regardless of its format, whether it be amplitude modulated, frequency modulated, phase modulated, or even be one of many packet formats, among many other possible schemes. Thereby, different optical channels could carry significantly different types of traffic. The second possible wavelength interchanger suggested by Thompson and Hunter is a four-wave optical mixer, such as disclosed by Alexander et al., ibid. at page 727. This optical mixer is a multiple quantum-well waveguide relying upon third-order non-linear frequency conversion, for example, using an optical pump signal of frequency wp to convert an optical signal from a frequency $\omega_1$ to a frequency $\omega_2$. The frequencies are related in a simple conversion scheme by $$\omega_2 = 2\omega_p - \omega_1 \tag{2}$$

although more complex relationships obtain when another pump signal of a second pump frequency is used. Four-wave mixing is a wavelength conversion process that is transparent to digital signals of varying bit rates. Four-wave mixing, however, suffers several disadvantages over difference frequency generation. For a single pump signal, the pump frequency $\omega_p$ is between the two optical carrier frequencies $\omega_1$, $\omega_2$ and the tails of the pump signal, which needs to be large for a third-order non-linear conversion, overlap the optical carrier frequencies. Furthermore, four-wave mixing, being more complex, generates more cross terms, which can interfere with the optical carrier signals. As a result, it is more suitable for converting a single wavelength and is difficult to apply to bulk conversion, that is, the simultaneous conversion of multiple wavelengths.

SUMMARY OF THE INVENTION

The invention can be summarized as an optical switch for a wavelength-division optical communications network. In one aspect of the invention, the switch utilizes wavelength conversion by means of a bulk process which provides a frequency mirroring plane about which carrier frequencies are interchanged. The preferred frequency interchanging is accomplished by difference frequency generation. In its fullest implementation, a wavelength-division multiplexed signal received on one input can be switched to any of several wavelength outputs on any of several spatial outputs. In another aspect of the invention, the switch architecture has been extended to higher-order switches by means of a design methodology utilizing twisted Benes networks. These result in a series of four or more 2×2, or possibly higher-order, optical switches that are serially arranged but have at least one set of ports interconnected through wavelength interchanging elements. Preferably, the wavelength interchanging elements are difference frequency generators, possibly in combination with optical multiplexers and demultiplexers.

DETAILED DESCRIPTION OF THE PREFERRED EMBODIMENTS

One aspect of the invention utilizes difference frequency generation in a wavelength-division multiplexing (WDM) switch. Difference frequency generation is described by Yoo in U.S. Pat. No. 5,434,700 and by Yoo et al. in "Wavelength conversion by quasi-phase-matched difference frequency generation in AlGaAs waveguides," *Optical Fiber Conference '95*: Reader's Digest, PD14-2, San Diego, Calif., 1995. Yoo et al. describe a preferred method of forming such a difference frequency generator in "Quasi-phase-matched second-harmonic generation in AlGaAs waveguides with periodic domain inversion achieved by wafer-bonding," *Applied Physics Letters*, vol. 66, 1995, pp. 3410–3412. Importantly, difference frequency generation is a parametric conversion process based on the second-order non-linear susceptibility $X^{(2)}$ of the semiconductor quantum wells, but second-order non-linearities are as well obtainable from bulk materials such as $LiNbO_4$. This process converts an optical signal from the frequency $\omega_1$ to the frequency $\omega'_1$ according to relations of the sort $$\omega'_1 = \omega_p - \omega_1 \tag{3}$$

where $\omega_p$ is the frequency of the pump light used in the non-linear process. For efficient non-linear processes, the phase slip between the interacting waves, namely, the pump signal $\omega_p$, the input signal $\omega'_1$, and the output signal $\omega_1$, should be minimized or otherwise compensated throughout the interaction length. Yoo compensates for the phase slip by quasi phase matching. In general terms in quasi phase matching, the material through which the light waves propagate is imposed with a spatially varying non-linearity of period $\Lambda$ so that, when the waves are falling out of phase, the non-linearity is reduced in size or preferably reversed in polarity so as to maintain the direction of power transfer. For closely spaced wavelength channels, the pump frequency in frequency difference generation is about twice the optical carrier frequency so that the fundamental of the pump signal is easily separated from the optical carriers. Closely spaced channels are particularly desired in long-distance optical networks requiring intermediate erbium-doped fiber amplifiers, which have a passband of only a few tens of nanometers. Difference frequency generation differs fundamentally from four-wave mixing since it utilizes a second-order rather than a third-order non-linearity. Four-wave mixing hence uses a different set of pumping wavelengths than does difference frequency generation. The difference frequency generator of Yoo is embodied in a multi-quantum-well waveguide fabricated from III–V semiconductor materials, although other embodiments are possible.

Figure 4:
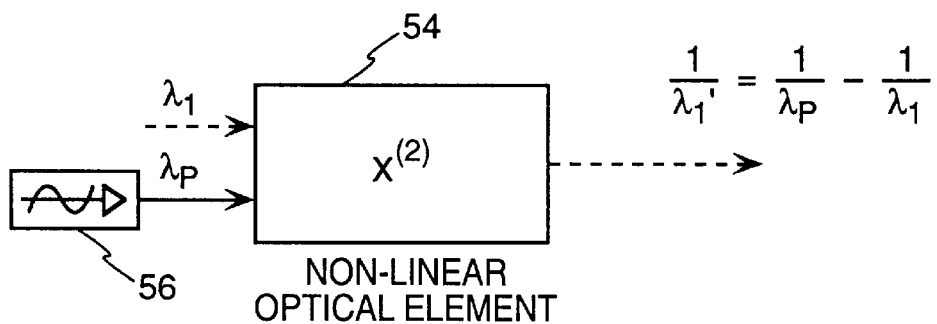
FIG. 4 is a schematic representation of a difference frequency generator relying upon a second-order non-linearity.

The conversion process is schematically illustrated in FIG. 4 for a non-linear medium 54 exhibiting a second-order non-linear susceptibility $X^{(2)}$. The optical signals are identified according to the more familiar wavelength designations of $\lambda_1$ for the input wavelength, $\lambda'_1$ for the output wavelength, and $\lambda_p$ for the pump wavelength, which are related by the equation $$\frac{1}{\lambda'_1} = \frac{1}{\lambda_p} - \frac{1}{\lambda_1}, \tag{4}$$

which is completely equivalent to Equation (3). Typically, the high-intensity pump signal is provided by a laser 56.

Figure 5:
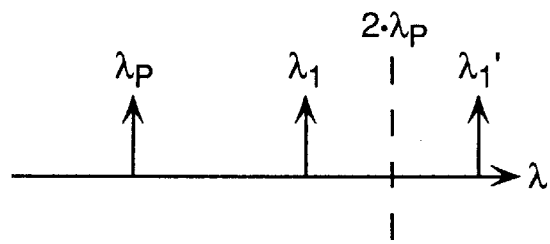
FIG. 5 is a graphical representation of the wavelengths involved in the difference frequency generation of FIG. 4.

FIG. 4 is meant to be only schematical and not to represent the physical processes. Because the coefficients for optical non-linearities are usually very small, it is usually necessary to confine the light to a small volume, usually in the form of a waveguide, and to lengthen the length of interaction. Thus, all three signals propagate collinearly. The described embodiments propagate all three optical signals in parallel, but anti-parallel propagation (counter-propagation) of different ones of the optical signals is possible. The relationships between the wavelengths are schematically illustrated in FIG. 5.

An important aspect of the transparency is that it does not matter which format is used for any of the different frequency-differentiated channels. The optical switches and amplifiers process the signals according to their optical carrier frequency with total disregard to the format of the data impressed on that carrier. Thus, amplitude-modulated, frequency-modulated, and phase-modulated signals are equally and concurrently carried and switched by the networks of the present invention.

Although we will talk in terms of the conversion of a signal from one wavelength (or frequency) to another, the physics is more complicated. In the parametric interaction of Equations (2) and (3), one pump photon is annihilated to create two signal photons at $\omega_1$, $\omega_2$ (or $\lambda_1$, $\lambda_2$). Thus, the signal at $\omega_1$ is not being converted to a signal at $\omega_2$, but the $\omega_2$ signal grows at a rate dependent upon the size of the $\omega_1$, signal, and indeed both signals are simultaneously growing. As a result, the $\omega_2$ signal may undergo greater than 100% conversion in the sense that it grows to a value greater than the original values of the $\omega_1$ signal.

Another important physical effect is that the parametric conversion between the two signals at $\omega_1$, $\omega_2$ usually involves a change of polarization. In the anticipated rectangular geometry of difference frequency generators, the conversion is between the TE and TM polarization modes. The processes are symmetric for the two processes so that a mixed polarization mode (TE, TM) is converted to a similarly mixed mode (TM, TE). Thus, the process is independent of polarization in terms of power.

Figure 6:
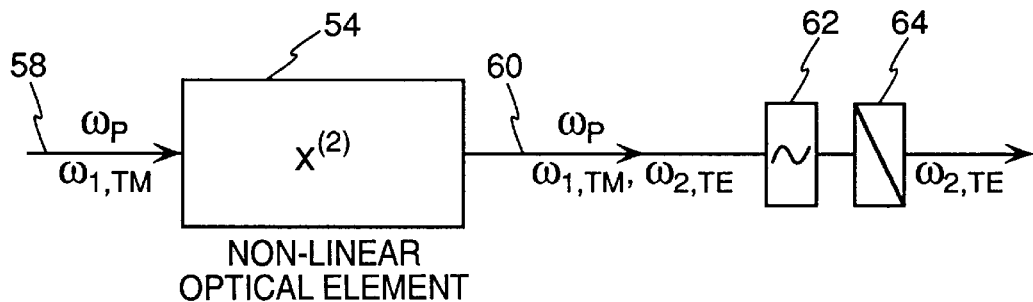
FIG. 6 is a network diagram of the conversion of optical frequency and polarization through a parametric-gain medium.

Structures are well known that separate orthogonally polarized modes, especially TE and TM modes on a rectangular waveguide, and these structures can be integrated onto the chip. Thus, two signals of differing frequency and having orthogonal modes propagating on a waveguide can cause signals of the same respective frequencies but of orthogonal polarizations to be created on the same waveguide while the original signals also increase. Nonetheless, polarization-separating techniques can discard the old polarization and frequency state and filter through only the new polarization and frequency state. It is anticipated that conversion efficiencies of about 30% will be optimal for system performance. That is, the intensity of the converted signal will be about 30% of the original intensity of the source signal. FIG. 6 is a schematical diagram showing an input waveguide 58 carrying both a pump signal $\omega_P$ and an input signal $\omega_{1,TM}$ of frequency $\omega_1$, and of TM polarization that are collinearly incident on the non-linear medium 54. An output waveguide 60 bears the pump signal $\omega_P$ the original signal $\omega_{1,TM}$, and the converted signal $\omega_{2,TE}$ of frequency $\omega_2$ and of TE polarization. A spectral filter 62 removes the pump signal $\omega_P$, and a polarization beam splitter 64 removes the TM-polarized signal $\omega_{1,TM}$.

Figure 7:
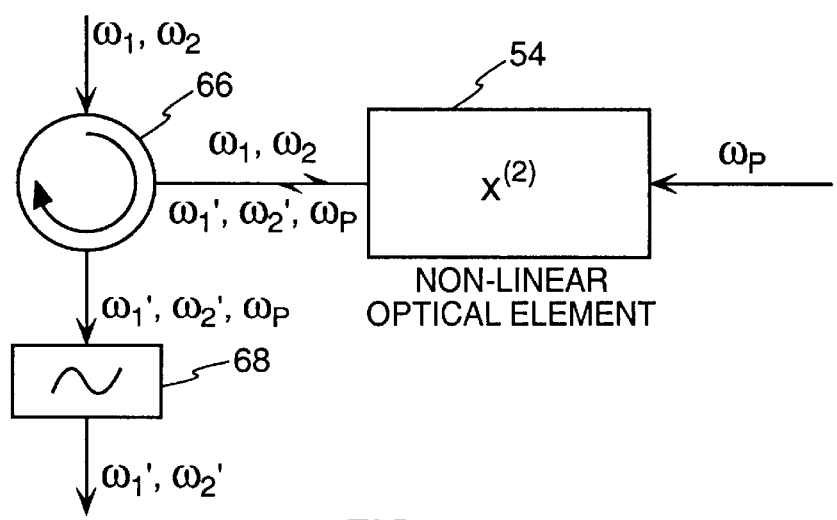
FIG. 7 is a network diagram of backward parametric interaction in a parametric-gain medium.

An alternative network, illustrated schematically in FIG. 7, relies upon anti-collinear interaction. Two input signals $\omega_1$, $\omega_2$ pass through an optical circulator 66 to the non-linear medium 54. The pump signal $\omega_P$ is input to the non-linear medium 54 in the opposite direction from the input signals $\omega_1$, $\omega_2$. The non-linear interaction creates output signals $\omega'_1$, $W'_2$ propagating anti-collinearly with the inputs signals $\omega_1$, $\omega_2$. The optical circulator 66 separates the output signals $\omega'_1$, $\omega'_2$ and the pump signal $\omega_P$ from the input signals $\omega_1$, $\omega_2$. An optical filter 68 removes the pump signal $\omega_P$ and thus outputs only the converted signals $\omega'_1$, $\omega'_2$. Thereby, the converted signals $\omega'_1$, $\omega'_2$ are separated from the unconverted signals $\omega_1$, $\omega_2$ regardless of polarization.

This complexity will not be further considered, and complete conversion between signals of differing frequency will be assumed without further consideration of the intensity of the original signal or its polarization.

We have observed that the conversion processes of difference frequency generation are suited to bulk conversion, that is, to the simultaneous interchange of multiple pairs of wavelengths. A difference frequency generator also can decrease the wavelength of an optical signal if the doubled pump wavelength $2\lambda_P$ is less than the input wavelength $\lambda_1$. Equation (4) applies equally well to this case although the wavelength illustration of FIG. 5 assumes that $2\lambda_P$ is larger than $\lambda_1$. Thus, if two optical carrier wavelengths $\lambda_1$, $\lambda_2$ and the pump wavelength $\lambda_P$ of two optical signals and a pump signal propagating together across a non-linear material are chosen such that the doubled pump wavelength falls between the two carrier wavelengths according to the relation $$\frac{1}{\lambda_P} = \frac{1}{\lambda_1} + \frac{1}{\lambda_2}, \qquad (5)$$

the difference frequency generator of FIG. 4 simultaneously interchanges the wavelengths of the two optical signals. Table 1 shows the wavelength interchange between two data signals entering at input port $P_1$ and leaving at output port $P_1$ on the two optical carrier wavelengths $\lambda_1$, $\lambda_2$.

TABLE 1

| INPUT | OUTPUT |
|---|---|
| $\lambda_1^{P1}$ | $\lambda_2^{P1}$ |
| $\lambda_2^{P1}$ | $\lambda_1^{P1}$ |

The physical processes involved are more easily explained in the frequency domain for which Equation (5) is recast as $$\omega_P = \omega_1 + \omega_2 \qquad (6)$$

to show that the halved pump frequency $\omega_P/2$ should be selected to be the arithmetic average of the two optical carrier frequencies $\lambda_1$, $\lambda_2$. That is, the halved pump frequency defines a frequency mirror for imaging data signals between the two frequency planes, as has already been introduced in FIG. 3.

Figure 8:
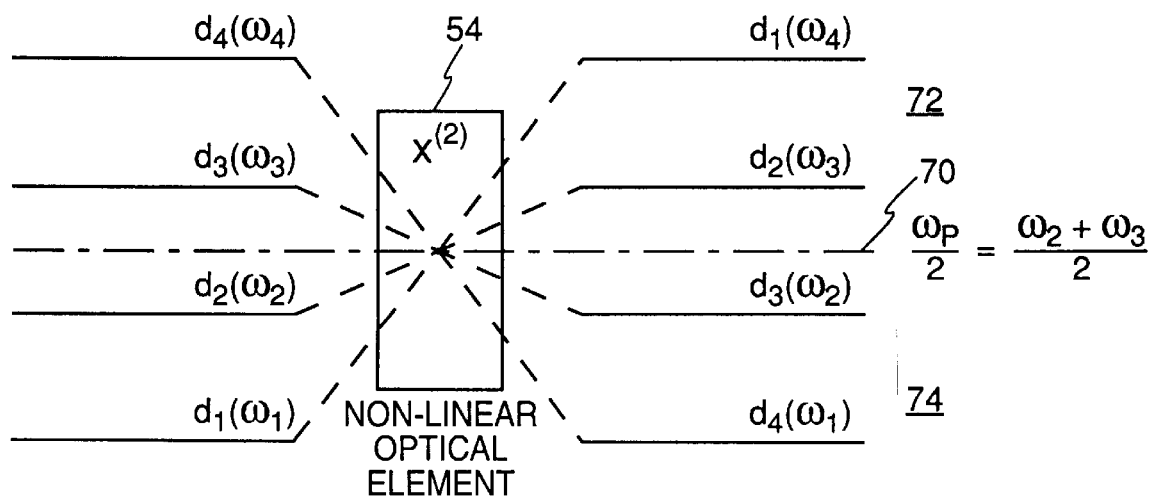
FIG. 8, is a schematical representation of four-way frequency mirror imaging relying upon the difference frequency generation of FIG. 4.

The frequency imaging can be extended to larger numbers of carrier frequencies. FIG. 8 schematically illustrates a typical wavelength (frequency) arrangement for four data signals $d_1$, $d_2$, $d_3$, $d_4$ and four evenly spaced WDM frequencies $\omega_1$, $\omega_2$, $\omega_3$, $\omega_4$. The halved pump frequency $\omega_P/2$ is placed at the midpoint and defines a frequency mid-plane 70. It is not necessary that the WDM frequencies be evenly spaced but $\omega_P/2$ must be the arithmetic average of any two frequencies it mirrors. As illustrated, the difference frequency generator 54 mirrors the data signals between two frequency half spaces 72, 74.

The difference frequency generator is not limited to only four frequencies that it can simultaneously convert, and the number may be larger. Also, the halved pump frequency 70 need not be placed at the mid-point of the entire frequency ladder, for example at the mid-point between $\omega_2$, $\omega_3$, as illustrated. This position will be designated as (2,3) for the four-frequency ladder of FIG. 8. Instead, it may be placed at some other mid-point of neighboring frequencies, for example, at (1,2). At this position, the data signals at the two frequencies $\omega_1$, $\omega_2$ have their carrier frequencies interchanged. The remaining frequencies $\omega_3$, $\omega_4$ are converted to frequencies that are out of the four-frequency band and so do not interfere. It is noted that simultaneous conversion of multiple pairs of frequencies is almost impossible with four-wave mixing because of the large number of cross terms.

Frequency difference generation thus offers, even for a 2×2/2-λ wavelength interchanging cross-connect, the advantages of not having the pump frequency between closely spaced data signals and of allowing bulk conversion of multiple signals with little worry about interfering terms.

Figure 1:
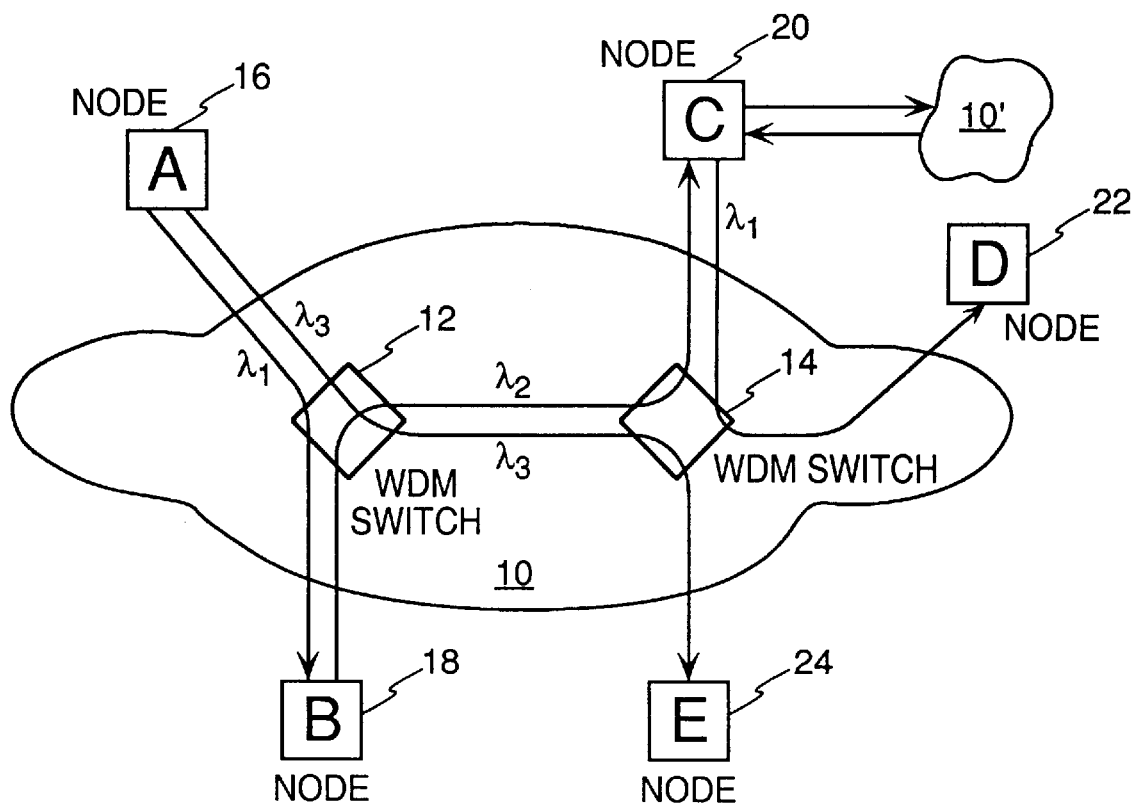
FIG. 1 is a network diagram of a wavelength-division multiplexed (WDM) optical network.
Figure 2:
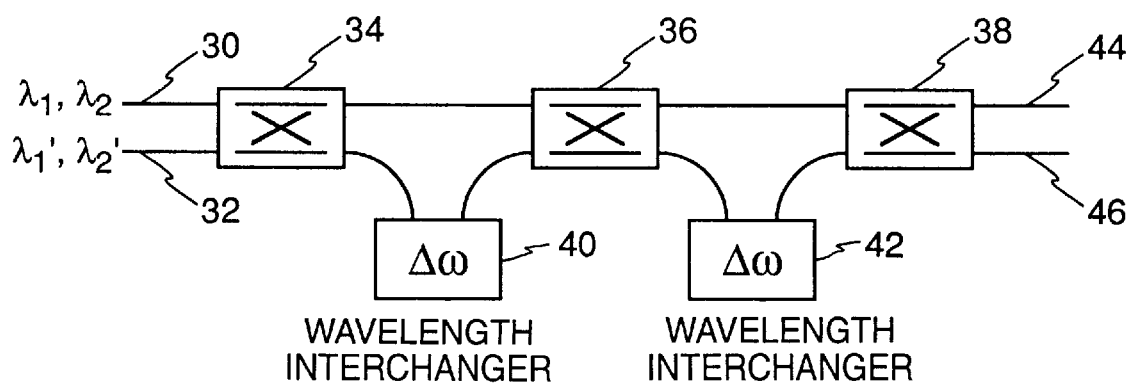
FIG. 2 is an network diagram of a prior-art 2×2 WDM switch utilizing a wavelength interchanger.
Figure 9:
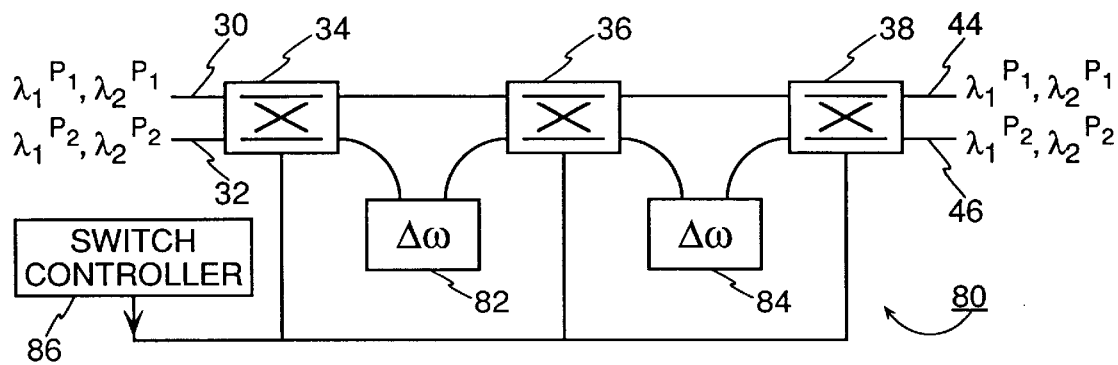
FIG. 9 is a network diagram a 2×2/2−λ wavelength interchanging cross-connect of the invention.

As illustrated in the network diagram of FIG. 9, a 2×2/2-λ wavelength interchanging cross-connect 80 of the invention is achieved by substituting difference frequency generators 82, 84 for the wavelength interchangers 40, 42 of FIG. 2 of Thompson and Hunter. The difference frequency generators 82, 84 are pumped at the frequency $2 \cdot (\omega_1 + \omega_2)$. A switch controller 86 controls the two-wavelength 2×2 switches 32, 34, 36 according to the looping algorithm dependent on which input ports request to be connected to which output ports. It is noted that the switch controller 86 need not control the difference frequency generators 82, 84 since the state of these elements is independent of the overall switch state. The switching network 80 of FIG. 80 of FIG. 9 is equivalent to the modified Benes switching network 48 of FIG. 3.

The above description shows the feasibility of switching signals and converting their wavelength, but for an operational network switch two questions remain unanswered. First, is the switch non-blocking? Secondly, how is the switch routing determined to route (and wavelength convert) any input signal on an input port to any unused combination of output port and wavelength without interfering with existing connection? For a 2×2/2-λ switch, there are 64 possible switch states and it would be possible to examine them all in selecting the routing for the 24 different output configurations. However, this approach quickly becomes infeasible for larger sized switches. However, the general answers to both these questions lie in relying upon the modified Benes switching network that is equivalent to the wavelength interchanging cross-connect of the invention.

Figure 3:
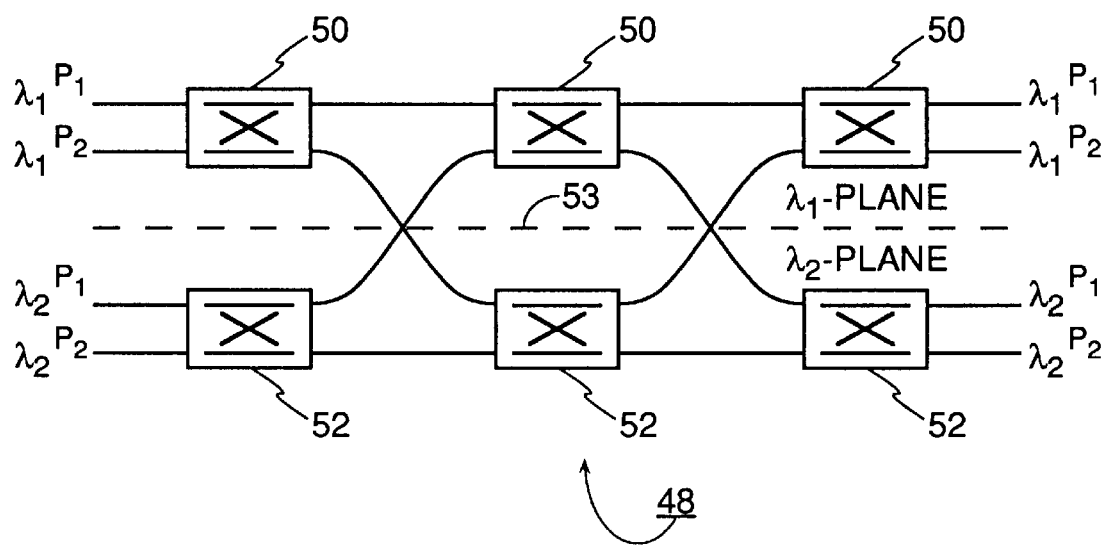
FIG. 3 is a schematical illustration of the switch of FIG. 2, but including a novel interpretation.

The modified 2×2/2λBenes network 48 of FIG. 3 differs from the true Benes network only by exchanges of the upper and lower input and output ports of the lower 2×2 cross connects 52. This amounts only to a relabeling of ports. This rearrangement will be called a twisted arrangement, a nomenclature that will become apparent for the larger sized networks to be introduced later.

It is well known that Benes networks are rearrangeably non-blocking. See, for example, the discussion by Hinton, ibid., pp. 87–90. They are rearrangeably non-blocking in the sense that any unused input port can always be connected to any unused output port although it may be required to rearrange the preexisting signal paths through the Benes network. The general algorithm for setting up connections in Benes networks (as well as other classes of rearrangeable switching networks) is disclosed by Opferman and Tsao-Wu in "On a Class of Rearrangeable Switching Networks, Part I: Control Algorithm," *Bell System Technical Journal*, vol. 50, 1971, pp. 1579–1600. The set-up algorithm is often referred to as a looping algorithm and is related to the recursive construction of a higher-order Benes network. We have proved that twisted Benes networks are also rearrangeably non-blocking and that the looping algorithm, with relabeling of ports, can be used to route newly set-up signals through the modified Benes networks. Varma provides some of the mathematical underpinning in "Rearrangeability of multistage shuffle/exchange networks," *IEEE Transactions on Communications*, vol. 36, 1988, pp.1138–1147.

The looping algorithm will be described in some detail with reference to FIG. 13, to be introduced in detail later, but Opferman and Tsao-Wu should be consulted for mathematical rigor. The looping algorithm is a recursive algorithm that starts at the outside of the switching network and works its way inward. Let I represent an arbitrary input and p(I) the output to which I will be connected. Let p(j) be the output that pairs with p(I) on a single 2×2 switch 96 in the last stage 94, where j may or may not pair with I on a 2×2 switch 96 in the first stage 92.

The looping algorithm starts at an arbitrary input I and connects it to the center-stage network 48, 48, which includes both upper and lower network modules 48. Because the output p(I) pairs with p(j), the input j is connected to output p(j) through the upper network module 48. Then input j pairs with another input that will be called k. If k=I, one loop of the looping algorithm has been completed, and another arbitrary input is selected. If k≠I, then the input k is connected to the output p(k) through the lower network module 48 of the center-stage network 48, 48. The same pattern is continued of alternating the upper and lower center-stage network modules 48 and of connecting inputs and outputs based on their pairs with the last connection until an input or output is reached that pairs with an already connected input or output. At that point, another idle input is chosen at random, and the process is restarted.

When all the inputs and outputs of the outer stages 92, 94, the process is repeated for the next lower level, in this case, within each of the network modules 48, where the dotted lines indicated the center-stage network and parallel network modules, here the fundamental 2×2 switches. The algorithm is quite general and can be applied to much larger switching networks than the one illustrated.

An example will be presented for one particular routing permutation of the 2×2/2-λ wavelength interchanging cross-connect as dictated by the connections shown in TABLE 2. The table shows for a respective data signal in each column the input port and wavelength and the output port and wavelength. The tabulated permutation is presented only as an example, and all other permutations are possible.

TABLE 2

| INPUT | OUTPUT |
|---|---|
| $\lambda_1^{P1}$ | $\lambda_2^{P2}$ |
| $\lambda_2^{P1}$ | $\lambda_2^{P1}$ |
| $\lambda_1^{P2}$ | $\lambda_1^{P1}$ |
| $\lambda_2^{P2}$ | $\lambda_1^{P2}$ |

Figure 10:
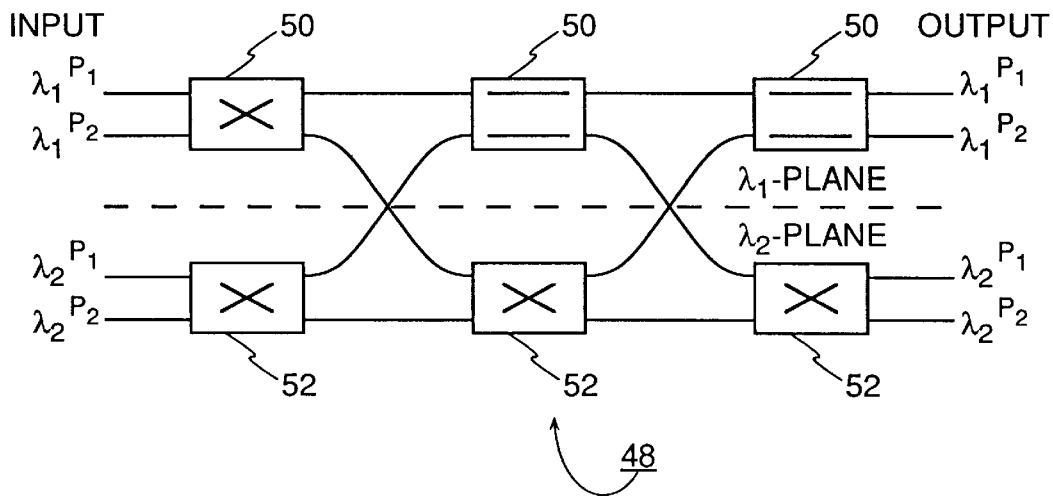
FIG. 10 is a network diagram of the modified Benes network that is equivalent to the wavelength interchanging cross-connect of FIG. 9.
Figure 11:
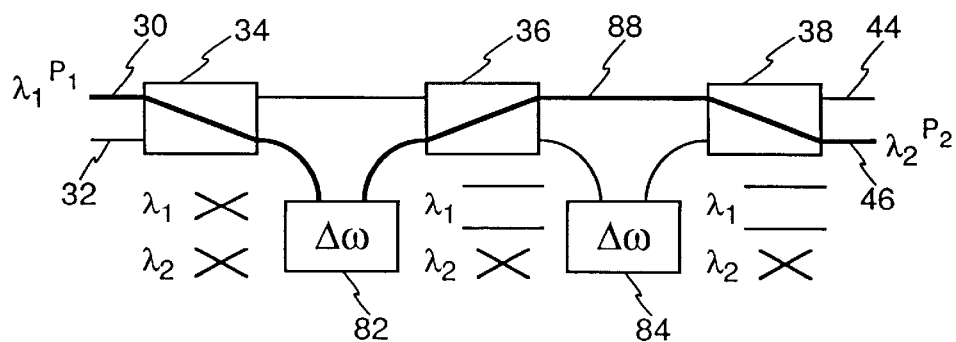
FIG. 11 is a schematical network diagram of the wavelength interchanging cross-connect of FIG. 10 for a particular switch state and with a particular path being highlighted.

The routing algorithm determines the cross and bar states of the 2×2 switching elements 50, 52 in the modified Benes network 48. One set of switch states (there are more than one dependent upon the previously set switch state) is shown in FIG. 10. The bar and cross states shown in the $\lambda_1$-plane are for the $\lambda_1$, signals while those in the $\lambda_2$-plane are for the $\lambda_2$ signals. FIG. 11 shows the same switch configuration for the equivalent wavelength interchanging cross-connect. The multi-wavelength switching states are shown for the two-wavelength 2×2 switching elements 34, 36, 38. A heavy line 88 shows the path of the first listed signal in TABLE 2 as it propagates and is transformed from the $\lambda_1^{P1}$ input to the $\lambda_2^{P2}$ output. Similar paths can be traced for the other three signals of TABLE 2.

The architecture and control of the 2×2/2–λ wavelength interchanging cross-connect (WIXC) is relatively simple and, except for the use of difference frequency generation, is similar to the proposal of Thompson and Hunter, although they provide no proof of the workability of their cross-connect. Extending the WIXC architecture to higher-order switches is non-trivial. It should be noted that higher order switches can be obtained by increasing the number of spatial ports, e.g., a 4×4/2–λ WIXC, by increasing the number of WDM frequencies, e.g., a 2×2/4–λ WIXC, or by increasing both. However, the reliance upon equivalent Benes switching networks provides some guidance since the Benes recursive theory teaches how to increase the order of a Benes switch while still retaining the non-blocking characteristic and the same switch rearrangement algorithm.

Figure 12:
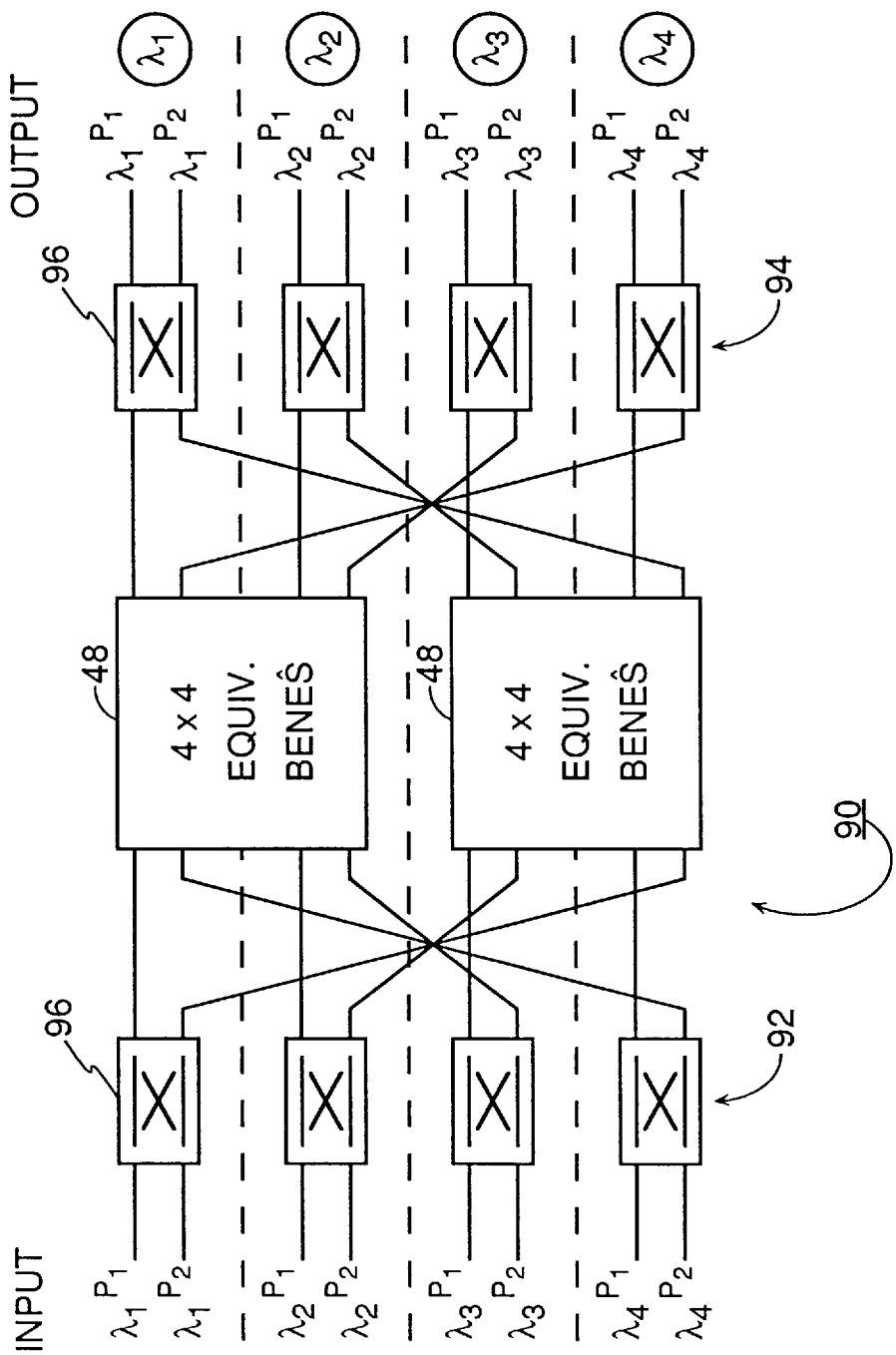
FIG. 12 is a schematic network diagram of the twisted Benes network that is equivalent to a 2×2/4−λ wavelength interchanging cross-connect.

FIG. 12 is a network diagram of a twisted Benes network 90 that is equivalent to a 2×2/4–λ wavelength interchanging cross-connect, and it illustrates how higher-order twisted Benes networks are recursively designed. Two lower-order twisted Benes networks 48 are arranged in parallel in the middle of the higher-order network 90. In this case, the lower-order Benes networks each replicate the Benes network 48 of FIG. 3, which is the equivalent of the 2×2/2–λ wavelength interchanging cross-connect. Around the middle are arranged two stages 92, 94 of the lowest-order switching elements, here 2×2 switching elements 96. In each stage 92, 94, four 2×2 switching elements 96, here assumed to be single-wavelength for the design algorithm, are connected to each of the lower-order Benes networks 48. The port and wavelengths for the network inputs and outputs are labeled for the 2×2 switching elements 96. It is seen that wavelength planes for the four wavelengths $\lambda_1, \lambda_2, \lambda_3, \lambda_4$ are established through the 2×2 switching elements 96. A detailed examination of the lower-order Benes networks 48, as illustrated in FIG. 3, shows that the wavelength planes extend through them as well.

The connections between the 2×2 switching elements 96 and the lower-order Benes networks 48 are such that half of the connections provide wavelength mirroring about the center, that is, the $\lambda_1$-plane mirrors into the $\lambda_4$-plane and the $\lambda_2$-plane mirrors into the $\lambda_3$-plane. That is, the standard form of the Benes network is modified to have twisted interconnections, and this reconfiguration applies equally well to the modified 2×2/2–λ Benes network 48 of FIG. 3.

Figure 13:
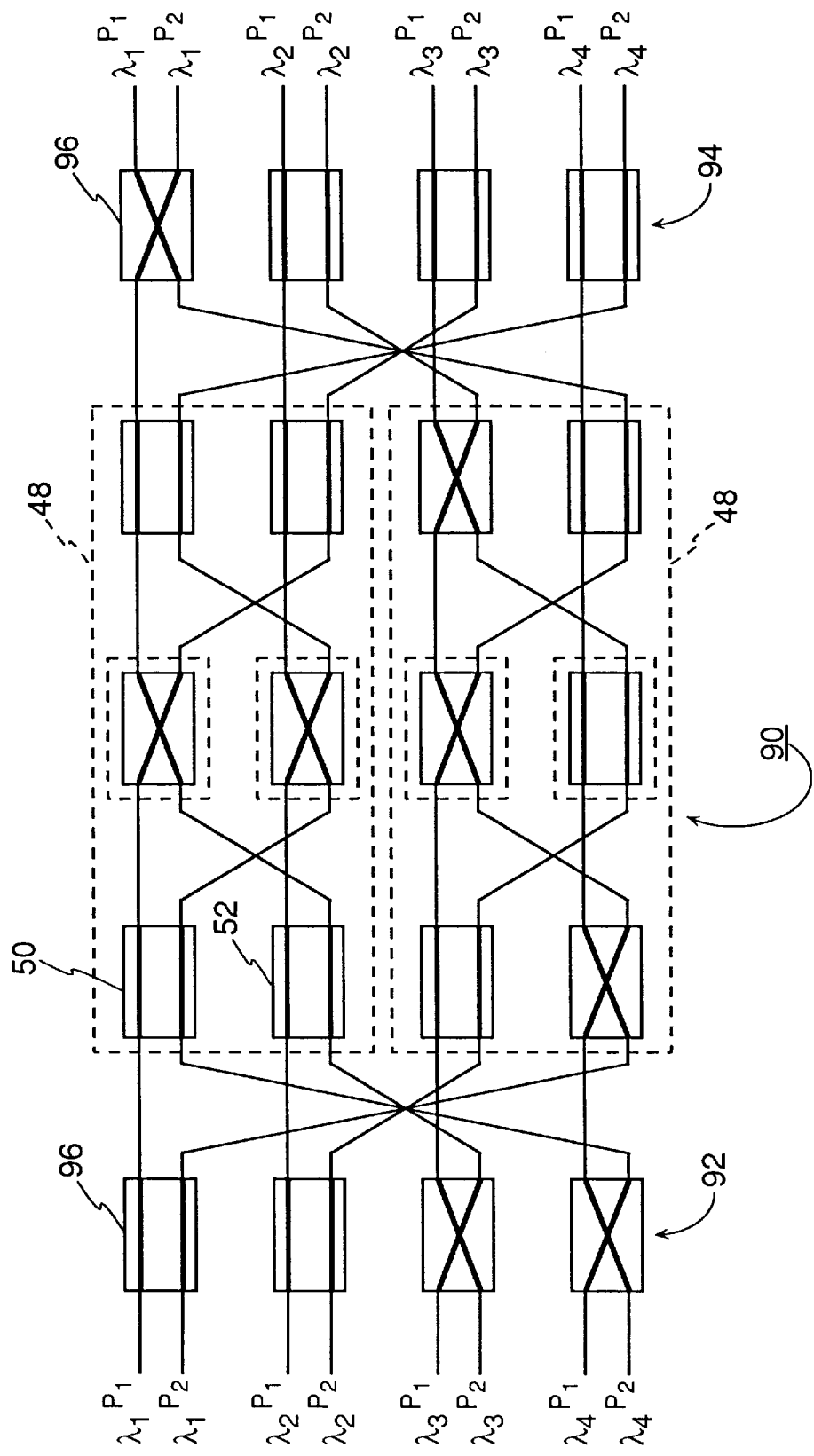
FIG. 13 is a network diagram of the twisted Benes network that is equivalent to a 2×2/4−λ wavelength interchanging cross-connect.
Figure 14:
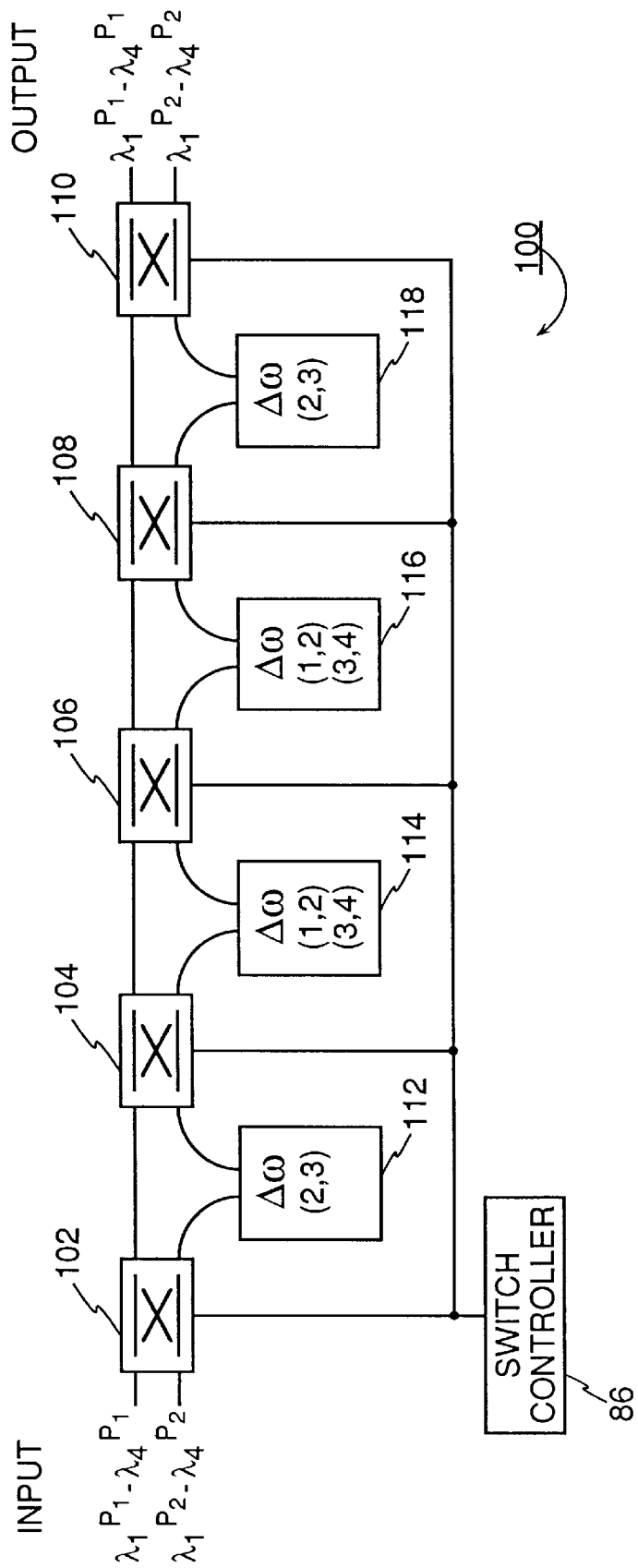
FIG. 14 is the 2×2/4−λ wavelength interchanging cross-connect of FIG. 13.

The conversion to the true 2×2/2–λ WIXC network requires a closer consideration of the connections within the lower-order Benes networks 48, as detailed in FIG. 13, which additionally shows one particular Benes switch permutation. The figure shows the need to mirror the wavelength planes at (2,3), that is, between the $\lambda_2$- and $\lambda_3$-planes at the connections between the lower-order Benes networks 48 and the 2×2 switches 96 of the outside stages 92, 94. However, the connections between the 2×2 switches 50, 52 of the upper lower-order Benes network 48 requires mirroring at (1,2) while the connections of the lower lower-order Benes network 48 requires mirroring at (2,3). Accordingly, the true 2×2/4–λ WIXC network 100, shown in FIG. 14, includes serially connected four-wavelength 2×2 switches 102, 104, 106, 108, 110. One set of ports of the switches 102 through 110 are connected directly together in series. The other sets of ports are connected through four frequency interchangers 112, 114, 116, 118. The two frequency interchangers 112, 118 are preferably difference frequency generators which are connected between the outside 2×2 switches 102, 110 and the intermediate 2×2 switches 104, 108 and which have a single pump wavelength with its doubled value $2\lambda_P$ at (2,3), that is, between $\lambda_2$ and $\lambda_3$, so as to form a central wavelength mirror. However, the two frequency interchangers 114, 116 connected between the intermediate 2×2 switches 104, 108 and the central 2×2 switch 106 may also be difference frequency generators but have two pump wavelengths at (1,2) and (3,4) so as to simultaneously interchange $\lambda_1$ with $\lambda_2$ and interchange $\lambda_3$ with $\lambda_4$. The wavelength interchanging cross-connect 100 of FIG. 14 is equivalent to the twisted Benes network 90 of FIG. 13. It is to be appreciated that types of frequency interchangers other than difference frequency generators may be used with the WIXC 100 of FIG. 14 as well as with other higher-order WIXCs.

One possible permutation for the switch set-up is given in TABLE 3.

TABLE 3

| INPUT | OUTPUT |
|---|---|
| $\lambda_1^{P1}$ | $\lambda_3^{P2}$ |
| $\lambda_1^{P2}$ | $\lambda_4^{P1}$ |
| $\lambda_2^{P1}$ | $\lambda_4^{P2}$ |
| $\lambda_2^{P2}$ | $\lambda_3^{P1}$ |
| $\lambda_3^{P1}$ | $\lambda_1^{P2}$ |
| $\lambda_3^{P2}$ | $\lambda_1^{P1}$ |
| $\lambda_4^{P1}$ | $\lambda_2^{P1}$ |
| $\lambda_4^{P2}$ | $\lambda_2^{P2}$ |

The switch controller 86 can use the looping routing algorithm to accomplish this permutation with the bar and cross states shown for the twisted Benes network 90 of FIG. 13. The states shown in the different rows apply to the different frequencies so that four wavelength sub-states are imposed on each four-wavelength 2×2 switch 102 through 110 in the true 2×2/4–λ wavelength interchanging cross-connect 100 of FIG. 14.

Dual frequency mirroring can be accomplished by imposing upon the non-linear medium two quasi-phase-matching gratings of periods $\Lambda_1, \Lambda_2$, each of which interact only with the respective combination of pump frequency and the two frequency channels to be interchanged. More complex, combined gratings are conceivable. It is possible to have two different pump signals for the two pairs of data signals to be interchanged.

Figure 15:
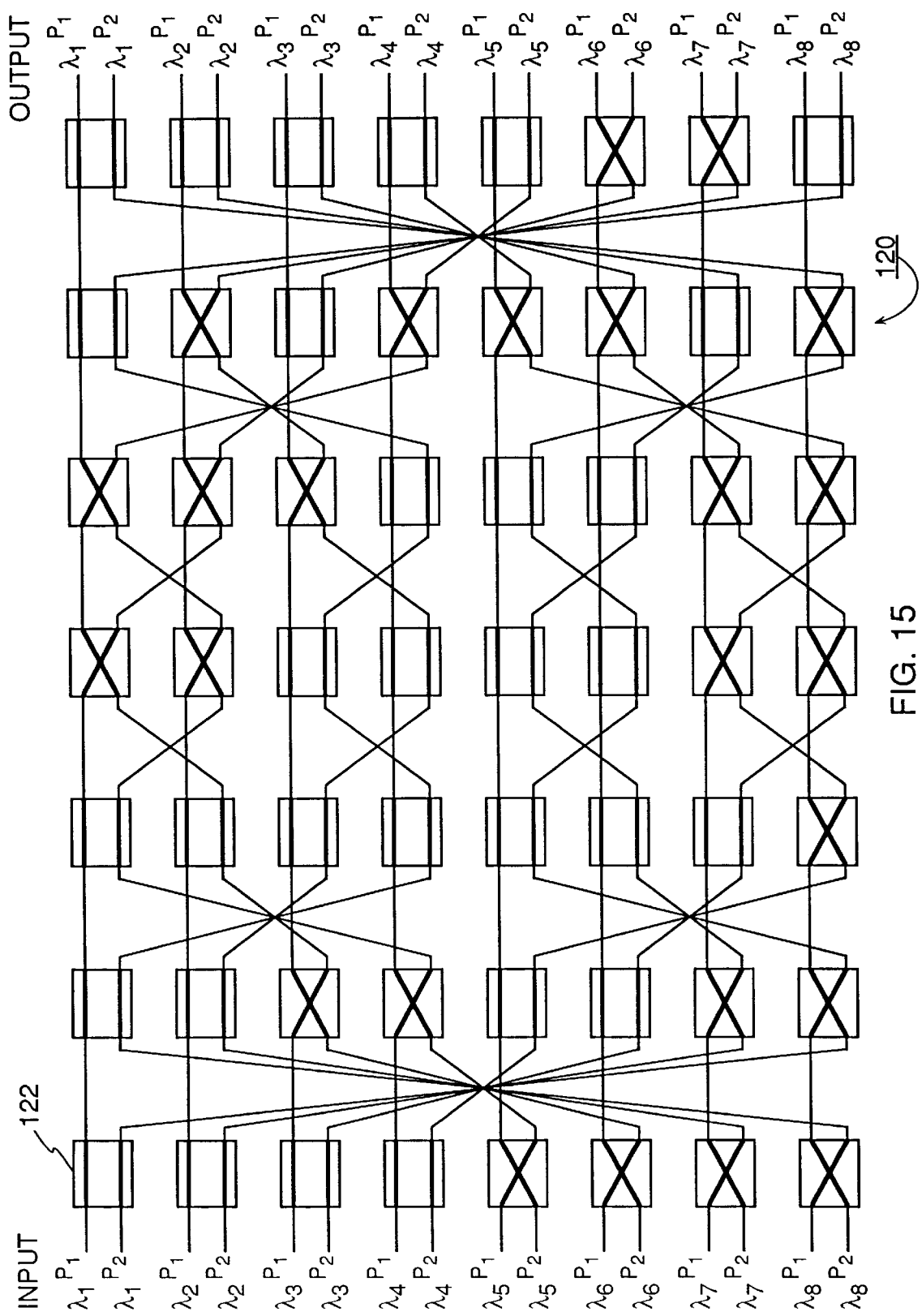
FIG. 15 is a network diagram of the twisted Benes network that is equivalent to a 2×2/8−λ wavelength interchanging cross-connect.
Figure 16:
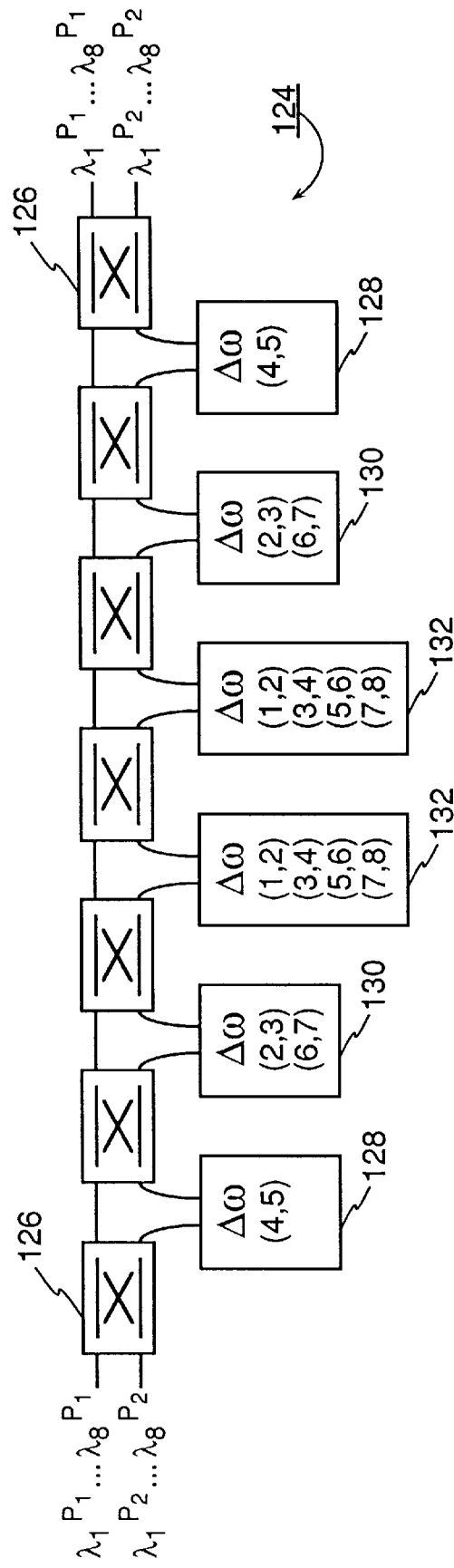
FIG. 16 is the 2×2/8−λ wavelength interchanging cross-connect of FIG. 15.

Using the recursive Benes construction, yet larger WIXCs can be constructed. A 16×16 twisted Benes network 120 shown in FIG. 15 includes seven columns each having eight 2×2 switches 122. The indicated switch states pertain to one exemplary permutation of the switch. With the indicated labeling of the input and output ports, this twisted Benes network 120 is equivalent to a 2×2/8–λ wavelength interchanging cross-connect 124 shown in FIG. 16 for the eight carrier wavelengths $\lambda_1$ through $\lambda_8$. This true WIXC includes seven serially connected eight-wavelength 2×2 switches 126 and three types of frequency interchangers 128, 130, 132 serially connected between one set of ports of the switches 126. The other set of ports of the switches 126 are directly connected in series. The outside frequency interchangers 128 are preferably difference frequency generators pumped at (4,5) to form a single mirror plane. The intermediate frequencies interchangers 130 can be difference frequency generators pumped at both (2,3) and (6,7) to form two mirror planes. The two central frequency interchangers 132, if implemented as difference frequency generators, would need to be pumped at (1,2), (3,4), (5,6), and (7,8) in such a way as to interchange only pairs of neighboring wavelengths. However, as will be discussed below, such a high multiplicity of pumping presents fundamental problems and can advantageously be avoided by other conversion schemes.

Figure 17:
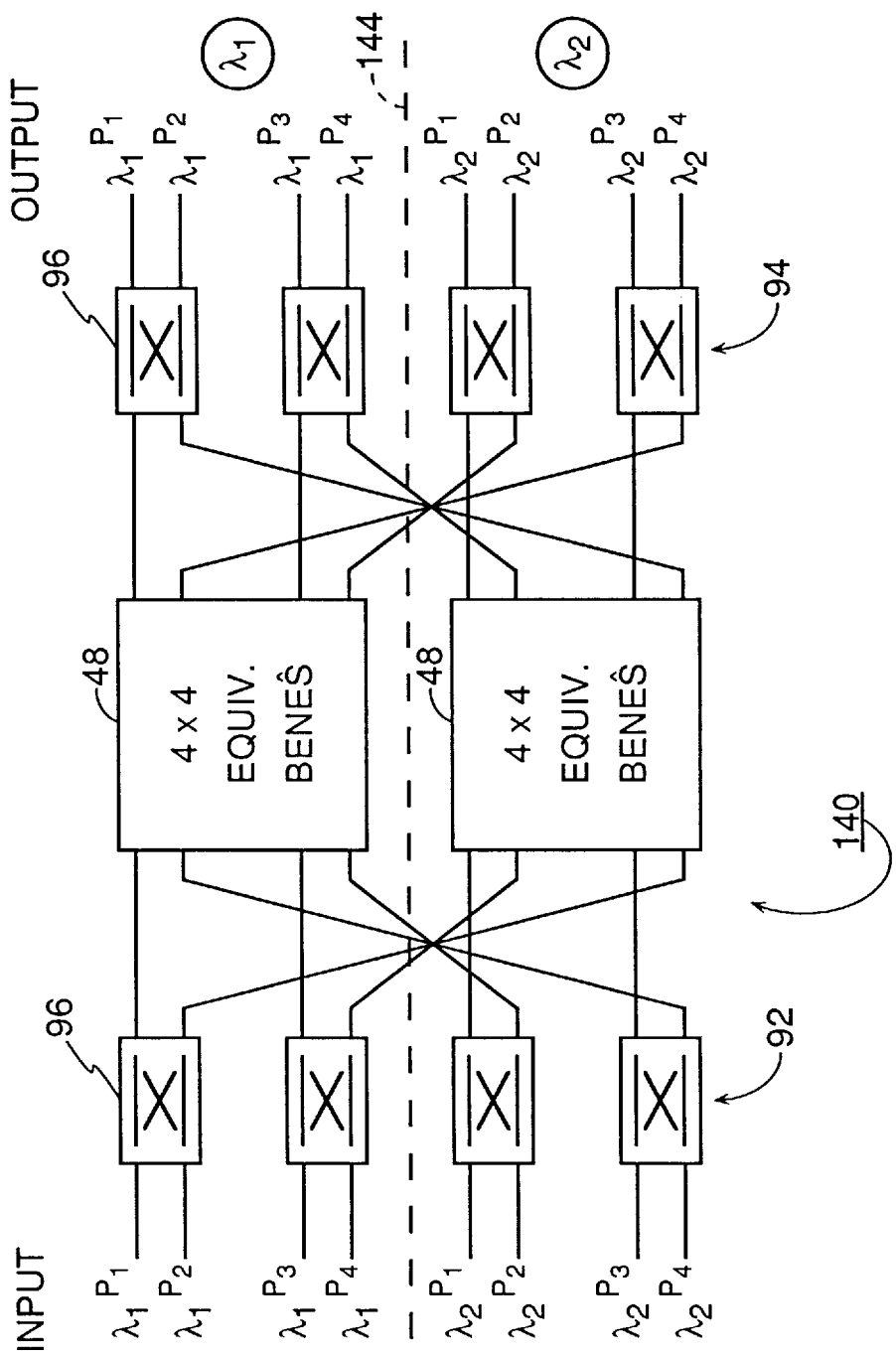
FIG. 17 is a network diagram of the twisted Benes network that is equivalent to a 4×4/2−λ wavelength interchanging cross-connect.
Figure 18:
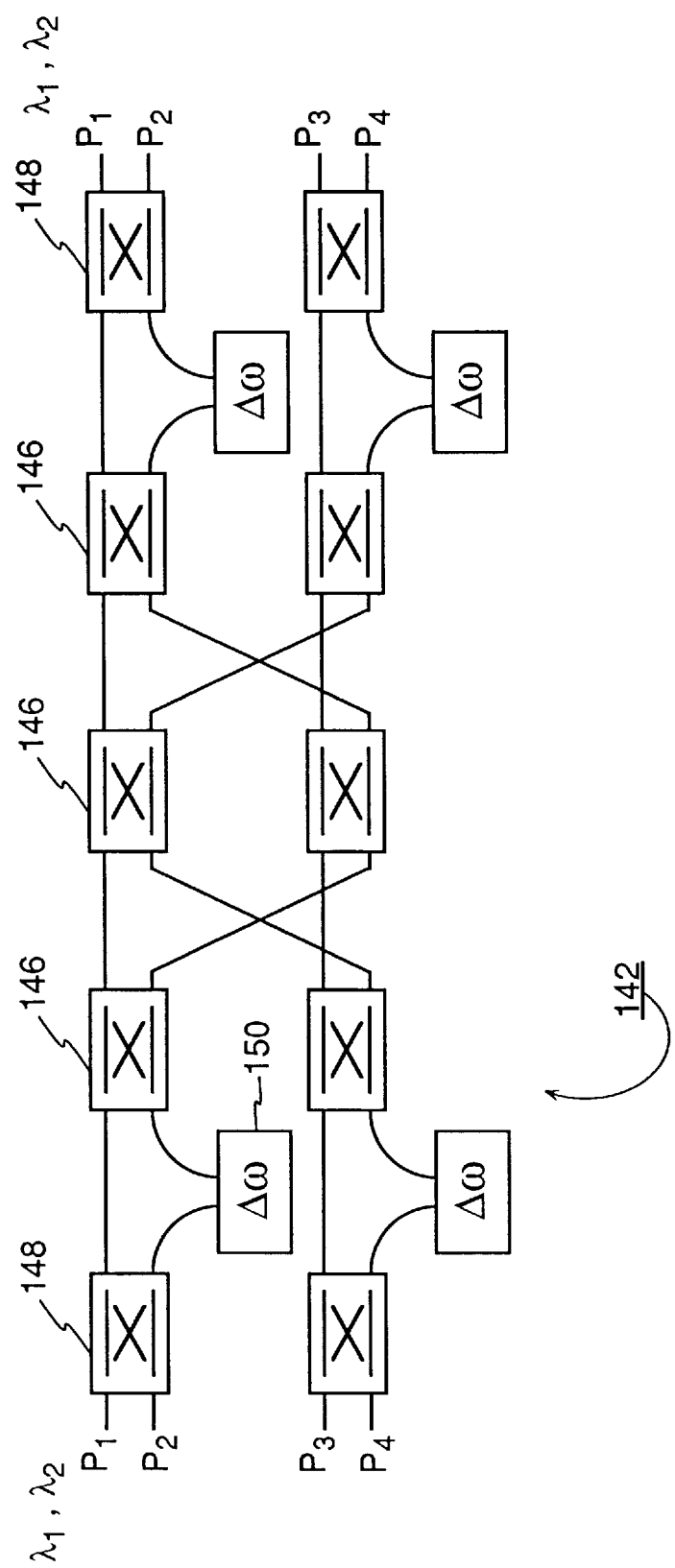
FIG. 18 is the 4×4/2−λ wavelength interchanging cross-connect of FIG. 17.

As mentioned previously, an increased number of physical ports will also increase the size of the wavelength interchanging cross-connect. FIG. 17 shows a twisted 8×8 Benes network 140 that is equivalent to a 4×4/2-λ true wavelength interchanging cross-connect 142 shown in FIG. 18. That is, the overall switch has four input and four output ports and uses two WDM wavelengths. It is noted that the only difference between the twisted Benes network 140 of FIG. 17 and the twisted Benes network 90 of FIG. 12 is the labeling of the inputs and outputs. However, the labeling is crucial in that it divides the Benes network 140 into only two wavelength planes, $\lambda_1$, $\lambda_2$ about a wavelength mirror plane 144, and thus a distinctly different wavelength interchanging cross-connect 142 is required. As shown in FIG. 18, the 4×4/2-λ wavelength interchanging cross-connect 142 includes six two-wavelength 2×2 switches 146 configured in a 4×4 Benes configuration and four two-wavelength 2×2 switches 148 paired at the input and output for the four spatial ports on each side. Four frequency interchangers 150, preferably difference frequency generators, are disposed between the outside switches 148 and the nearest ones of the inside switches 146 to provide the required wavelength mirroring between the two wavelength planes $\lambda_1$, $\lambda_2$. They are singly pumped at (1,2). As illustrated, the switches 146, 148 and frequency interchangers 150 are generally arranged in two parallel streams with some cross connections in the middle. The switch controller is not explicitly shown but follows from that described previously.

The extension to a 4×4/4-λ wavelength interchanging cross-connect is tedious but easily performed following the Benes recursive technique for a higher-order twisted networks. Except for the labeling of the ports, the equivalent twisted Benes network looks like that of FIG. 15.

As should be apparent, even higher-order switches can be easily constructed. A generalized K-port/W-wavelength wavelength interchanging cross-connect is constructed as follows. The result will be a KW×KW WIXC. First, create a 2×2/W'-λ twisted Benes network with the correct labels, as described before with reference to FIGS. 3, 12, and 15. The number of ports and number of wavelengths are such that $$W' = \frac{K \cdot W}{2}.$$ (7)

Then, group the outside 2×2 switches in groups of K/2 vertically contiguous 2×2 switches. Each group constitutes a K×K module consisting of K/2 2×2 switches. The ports are then relabeled for the new KW×KW design. The ports of the first group are labeled as $\lambda_1^{P1}$ to $\lambda_1^{PK}$, the ports of the second group are labeled as $\lambda_2^{P1}$ to $\lambda_2^{PK}$, etc., up to the ports of the W-th group being labeled as $\lambda_W^{P1}$ to $\lambda_W^{PK}$. The placement of the wavelength converters and the pumping wavelength becomes obvious from the labeling of the ports.

A principal consideration in choosing between the various architectures presented above is the component count, particularly the number of wavelength converters and whether they are singly pumped, doubly pumped, or require even more than two wavelength mirror planes. Singly pumped difference frequency generators are preferred, doubly pumped difference frequency generators are allowed, but more than two wavelength mirror planes present particular difficulties. Alternative components are described below.

Figure 19:
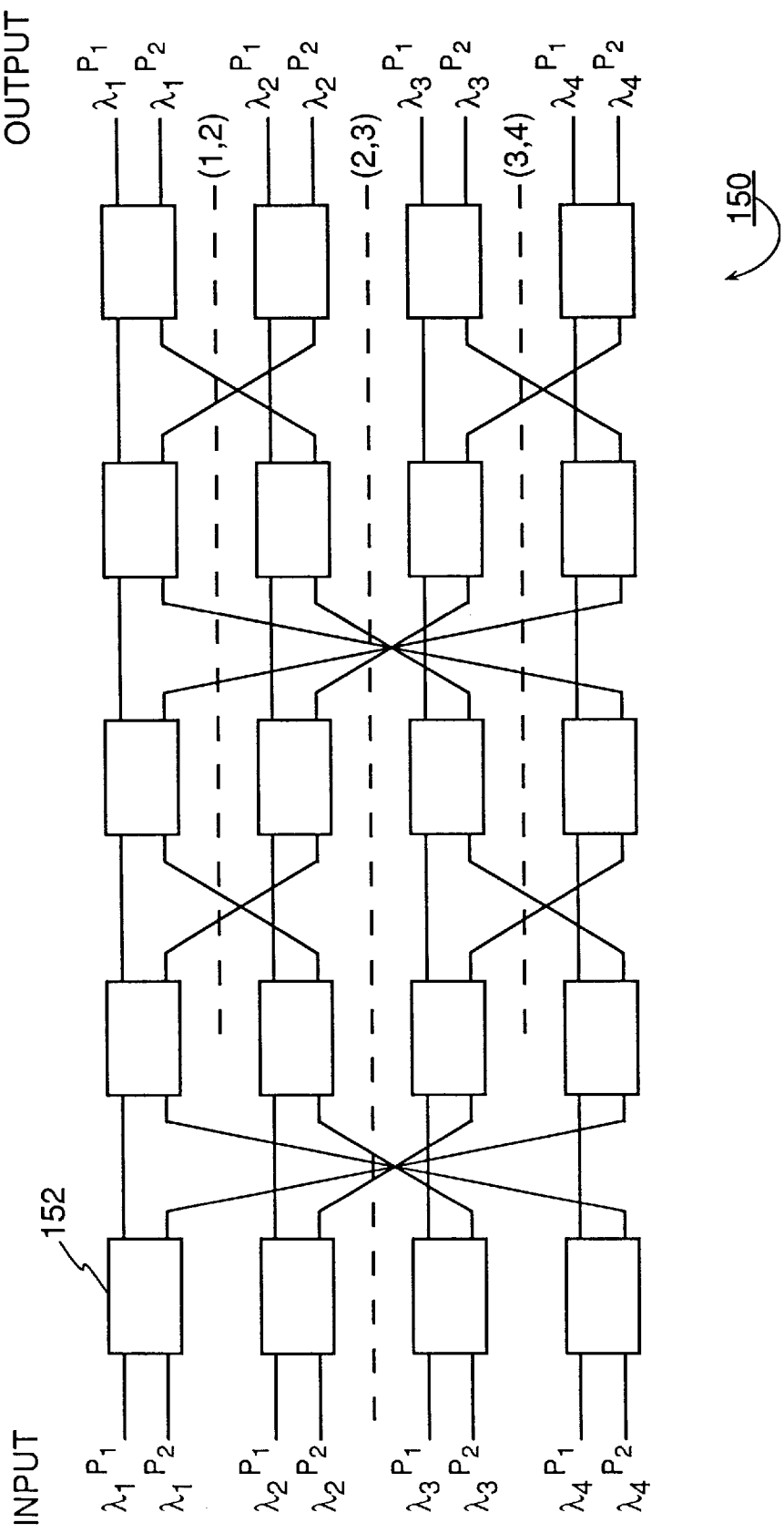
FIG. 19 is a network diagram of a non-recursively derived twisted Benes network that is equivalent to a 2×2/4−λ wavelength interchanging cross-connect.
Figure 20:
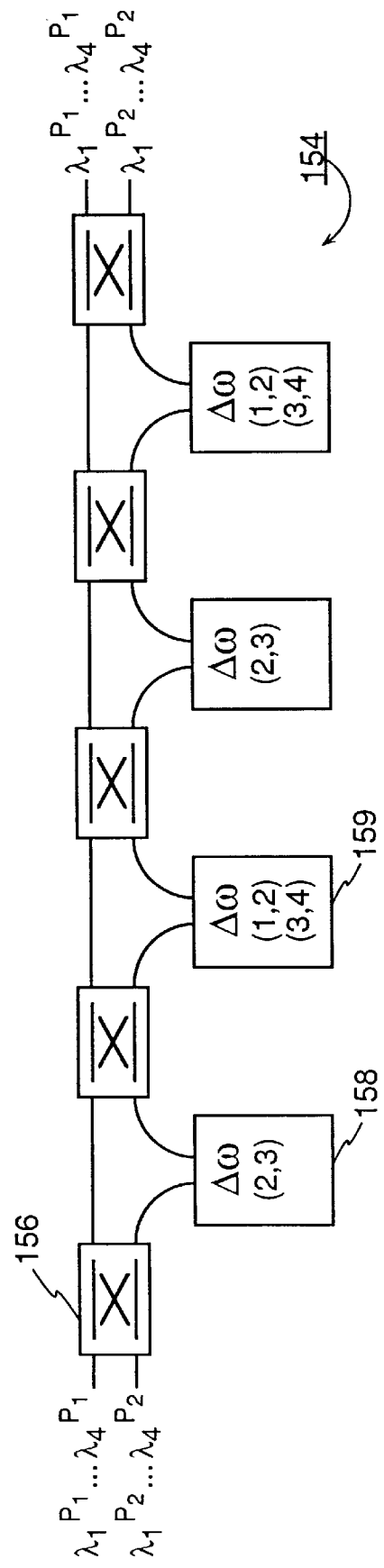
FIG. 20 is the 2×2/4−λ wavelength interchanging cross-connect of FIG. 19.

One approach to this problem is to construct twisted Benes networks having many WDM wavelengths but without relying upon the usual Benes recursive expansion technique. For instance, an 8×8 twisted Benes network 150 is shown in FIG. 19 having five stages each having four 2×2 switching elements 152. This design has four mirror planes (1,2), (2,3), (3,4). The number of switching elements 152 is the same as for a recursively derived Benes network, but the interconnections are not consistent with the recursive expansion. The ports of the Benes network 150 are labeled so the network is equivalent to a 2×2/4-λ wavelength interchanging cross-connect 154 shown in FIG. 20 which includes five four-wavelength 2×2 spatial switches 156, two singly pumped difference frequency generators 158, and two doubly pumped difference frequency generators 159. Importantly, between the switch stages, only single or double mirror planes are required. Also, the pumping is restricted to two classes, namely, single pumping at (2,3) and double pumping at (1,2), (3,4), these classes are sequenced in a repetitive pattern. This simplification facilitates a low-cost, replicative design.

The non-recursive Benes network however does not conform to the conditions required in the known proofs of the rearrangeably non-blocking character and of the looping algorithm. For a reasonably sized non-recursively constructed Benes switch, a table of connections compiled by brute force computer simulation can substitute for the more elegant mathematical proofs available for recursively constructed Benes switch.

Other components seem to be presently available for a WDM network having eight WDM wavelengths so that wavelength conversion between eight wavelengths $\lambda_1 \ldots \lambda_8$ will be required. A singly pumped difference frequency generator $\Delta\omega_{sp}[(4,5)]$ for a single wavelength mirror between $\lambda_4$ and $\lambda_5$ is easily achieved. A doubly pumped difference frequency generator $\Delta\omega_{dp}[(2,3), (6,7)]$ with two wavelength mirrors between $\lambda_2$, $\lambda_3$ and between $\lambda_6$, $\lambda_7$ has been demonstrated. As explained previously the center-offset, double mirrors partially convert the signals to out-of-band wavelengths.

Figure 21:
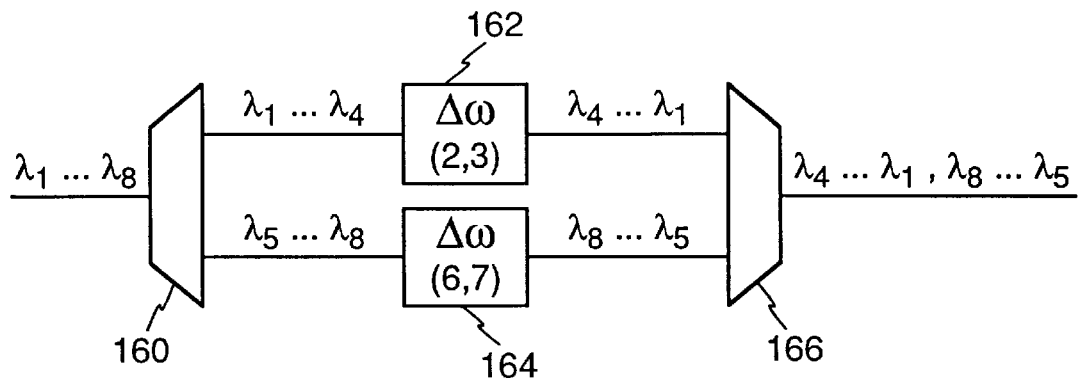
FIGS. 21 and 22 are network diagrams of two embodiments of 8-fold wavelength interchanging elements using singly pumped difference frequency generators, multiplexers, and demultiplexers.

However, a more immediately achievable equivalent component is illustrated in FIG. 21. A demultiplexer 160 divides an incoming stream of eight-wavelength signals $\lambda_1 \ldots \lambda_8$ into two streams carrying respectively four-wavelength signals $\lambda_1 \ldots \lambda_4$ and $\lambda_5 \ldots \lambda_8$. These are led through respective difference frequency generators 162, 164 singly pumped at respective points (2,3) and (6,7). Thereby, the wavelengths of the respective streams are mirrored about the respective wavelength planes into four-wavelength signals $\lambda_4 \ldots \lambda_1$ and $\lambda_8 \ldots \lambda_5$. A multiplexer 166 combines the two converted streams in a single output stream having the desired frequency arrangement $\lambda_4 \ldots \lambda_1, \lambda_8 \ldots \lambda_1$. Multiplexers and demultiplexers can be accomplished using phase-array gratings of the sort described by Amersfoort et al. in U.S. patent application Ser. No. 08/528,447, filed Sep. 14, 1995. Neighboring channels in such devices can be combined either by a very wide passband or by merging multiple channels away from the grating area. Even more easily, multiplexers can be accomplished by merging separate channels, and some demultiplexers can be accomplished by dichroic mirrors.

Figure 22:
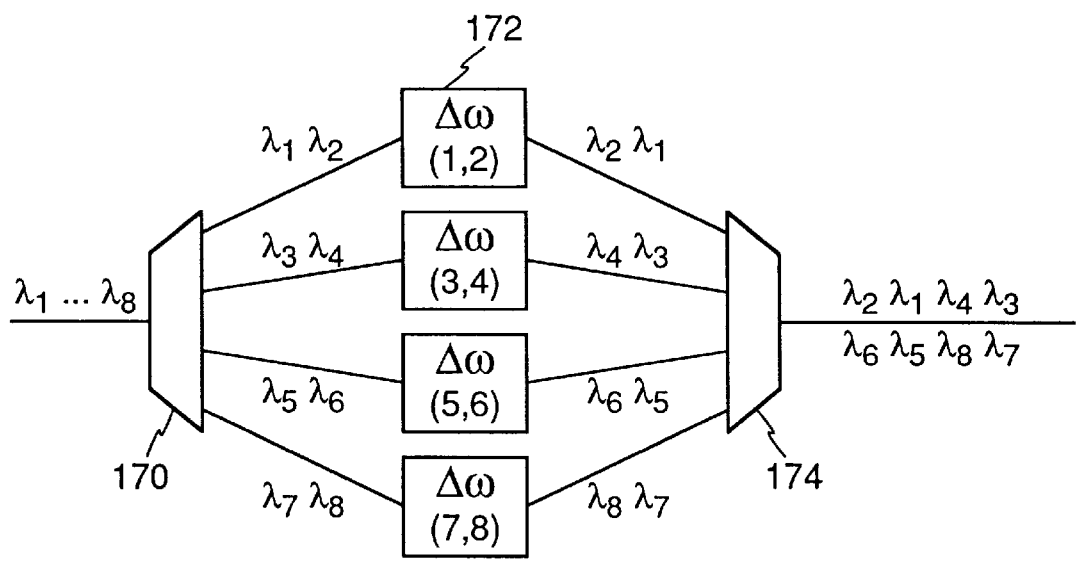

A quadruply pumped difference frequency generator $\Delta\omega_{qp}[(1,2), (3,4), (5,6), (7,8)]$ having four wavelength mirror planes is even more difficult to achieve and appears to be impractical because of overlapping conversion onto in-band wavelengths. However, two equivalent networks are available using multiplexers and demultiplexers. In a first such network, shown in FIG. 22, a demultiplexer 150 divides an incoming stream bearing eight wavelengths $\lambda_1, \lambda_2, \lambda_3, \lambda_4, \lambda_5, \lambda_6, \lambda_7, \lambda_8$ into four two-wavelength streams bearing respective signals $(\lambda_1, \lambda_2), (\lambda_3, \lambda_4), (\lambda_5, \lambda_6), (\lambda_7, \lambda_8)$. Four difference frequency generators 172 singly pumped at the respective points (1,2), (3,4), (5,6), (7,8) interchange the neighboring wavelength pairs, which a multiplexer 174 recombines into the stream $\lambda_2, \lambda_1, \lambda_4, \lambda_3, \lambda_6, \lambda_5, \lambda_8, \lambda_7$, which is the required net conversion of frequencies.

Figure 23:
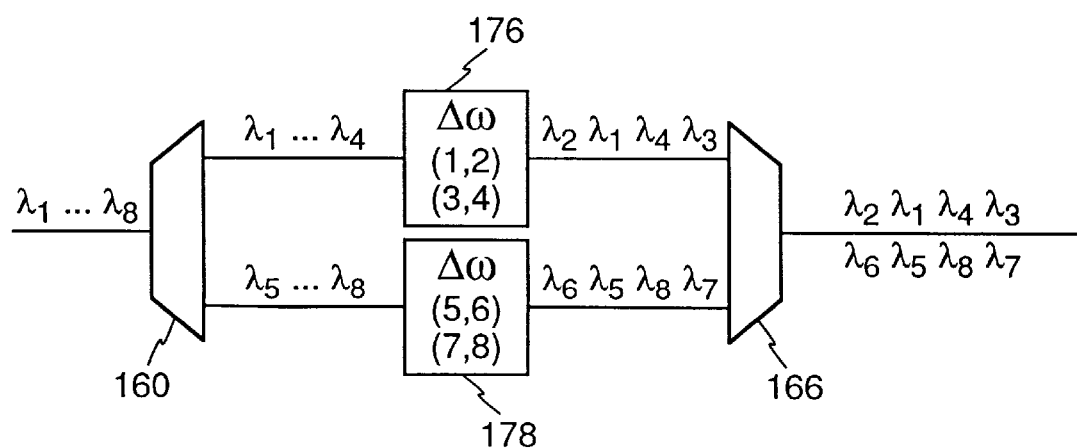
FIG. 23 is a network diagram of an 8-fold wavelength interchanging element using doubly pumped difference frequency generators, a multiplexer, and a demultiplexer.

Another equivalent wavelength converter is shown in FIG. 23 in which the demultiplexer 160 divides the incoming stream $\lambda_1 \ldots \lambda_8$ into two streams $\lambda_1 \ldots \lambda_4$ and $\lambda_5 \ldots \lambda_8$. A difference frequency generator 176 receiving the first stream $\lambda_1 \ldots \lambda_4$ is doubly pumped at the points (1,2) and (3,4) so as to create two wavelength mirror planes and produce a stream $\lambda_2, \lambda_1, \lambda_4, \lambda_3$. A second frequency generator 178 receiving the second stream $\lambda_5 \ldots \lambda_8$ is doubly pumped at the points (5,6) and (7,8) so as to produce a stream $\lambda_6, \lambda_5, \lambda_8, \lambda_7$. The multiplexer 174 combines these two streams into an output stream $\lambda_2, \lambda_1, \lambda_4, \lambda_3, \lambda_6, \lambda_5, \lambda_8, \lambda_7$.

Although the invention has been described in terms of the flexible but simple 2×2 spatial switch, other sized switches may be used taking advantage of the invention, including non-symmetric switches. Although frequency difference generation is particularly advantageous for the described switches, many aspects of the invention can be applied to other types of frequency interchanging elements, such as four-wave mixers, multiplexers and demultiplexers, or regenerators.

The invention provides a wavelength interchanging cross-connect with relatively few components, especially when difference frequency generation is utilized to effect wavelength interchange. Such a cross-connect allows a switching node to switch not only between spatial ports but also between wavelengths in a WDM network. The methodology developed allows the wavelength interchanging cross-connect to be expanded to larger size and allows the use of well known routing algorithms.

What is claimed is:

1. A wavelength interchanging cross-connect for a wavelength division multiplexing optical network operating with a least two optical signals and at least two corresponding input optical wavelengths, comprising;
   two spatial optical switches; and
   an optical difference frequency generator connected between respective ports of said two switches, receiving said two optical signals, and interchanging therein said two optical wavelengths between said two optical signals.

2. A cross-connect as recited in claim 1, wherein said optical difference frequency generator comprises a non-linear medium through which said two optical signals pass and an optical pump signal having a frequency which is the sum of the frequencies corresponding to said two optical wavelengths.

3. A wavelength interchanging cross-connect, comprising:
   first, second, third, fourth, and fifth spatial optical switches serially connected along a first path in the stated order; and
   first, second, third, and fourth wavelength interchanging elements disposed along a second path in the stated order between neighboring ones of said first, second, third, fourth, and fifth spatial optical switches.

4. A cross-connect as recited in claim 3: wherein
   said first and fourth optical wavelength interchanging elements disposed along said second path respectively between said first and second switches and said fourth and fifth switches perform a first class of wavelength interchanging; and
   said second and third optical wavelength interchanging elements disposed along said second path respectively between said second and third switches and between said third and fourth switches perform a second class of wavelength interchanging.

5. A cross-connect as recited in claim 3: wherein
   said first and third optical wavelength interchanging elements disposed along said second path respectively between said first and second switches and said third and fourth switches perform a first class of wavelength interchanging; and
   said second and fourth optical wavelength interchanging elements disposed along said second path respectively between said second and third switches and between said fourth and fifth switches perform a second class of wavelength interchanging.

6. A cross-connect as recited in claim 3, further comprising:
   a pair of said spatial optical switches disposed at opposite sides of said first through fifth spatial optical filters and connected thereto along said first path; and
   a pair of optical wavelength interchanging elements disposed along said second path between said pair of spatial optical switches and said first through fifth spatial optical filters.

7. An optical switching method, comprising the steps of:
   inputting and passing at least two optical signals having respective carrier frequencies collinearly through a medium that is optically non-linear at said carrier frequencies; and
   pumping said optically non-linear medium with a light beam having a pumping frequency, half the value of which falls between said carrier frequencies.

8. The method of claim 7, wherein said pumping induces difference frequency generation through a second-order optical non-linearity.

9. The method of claim 7, wherein there are at least four of said optical signals.

10. The method of claim 7, wherein said pumping of said single non-linear medium causes said optical signals to interchange their respective carrier frequencies.

11. An optical switching method, comprising the steps of:
    passing at least two optical signals having respective carrier frequencies through a medium that is optically non-linear at said carrier frequencies; and
    pumping said optically non-linear medium with a light beam having a pumping frequency, half the value of which falls between said carrier frequencies, wherein said pumping causes said optical signals to interchange their respective carrier frequencies and where there are at least four of said optical signals and said respective carrier frequencies are interchanged across a frequency mirror plane disposed at said half value of said pump frequency.

12. A wavelength-division multiplexing cross-connect for a communication network including at least four optical channels carried on respective wavelength carriers, comprising:
    a plurality of spatial switching networks having some of their ports connected in series capable of switching different ones of said optical channels into different directions; and a plurality of wavelength interchangers disposed between others of said ports interchanging said wavelength carriers between said optical channels.

13. A cross-connect as recited in claim 12, wherein said spatial switching networks receive at least four inputs to said cross-connect and send out at least four outputs from said cross-connect.

14. A cross-connect as recited in claim 12, wherein said wavelength interchangers are retained in respective same states of wavelength interchange and further comprising control means for controlling said spatial switching networks to be rearrangeably non-blocking.

15. A cross-connect as recited in claim 14, wherein said control means executes a looping algorithm to control said spatial switching networks.

16. A multi-wavelength cross-connect, comprising:

(2n+1) spatial optical filters serially connected along a first path, wherein n is greater than or equal to 2; and 2n wavelength interchanging elements disposed between neighboring ones of said spatial optical filters in a sequence along a second path.

17. The cross-connect of claim 16, wherein alternating ones of said sequence of said wavelength interchanging elements perform alternating ones of only two classes of wavelength interchanging.

18. A multi-wavelength cross-connect, comprising:

(2n+1) spatial optical filters serially connected along a first path, where n is greater than or equal to 2; and 2n wavelength interchanging elements disposed between neighboring ones of said spatial optical filters in a sequence along a second path, wherein alternating ones of said sequence perform alternating ones of only two classes of wavelength interchanging and wherein a first one of said two classes includes a first pumping wavelength and wherein a second one of said two classes includes second and third pumping wavelengths bracketing said first pumping wavelength.

19. A cross-connect as recited in claim 1, wherein said network comprises an optical fiber carrying said two optical signals and coupled to at least one of said optical switches.

20. The method of claim 7, further comprising transmitting said at least two optical signals on an optical fiber.

21. An wavelength-division multiplexed optical communication network, comprising:

at least two optical fibers each adapted to carry two optical signals having respective first carrier frequencies; and an optical difference frequency generator connected between said two optical fibers and interchanging said carrier frequencies between said two optical signals.

22. The network of claim 21, wherein said optical difference frequency generator comprises a non-linear medium through which collinearly propagate said two signals and an optical pump signal having a frequency which is the sum of said carrier frequencies.

23. The network of claim 22, wherein said non-linear medium includes a spatially varying optical non-linearity.

24. The cross-connect as recited in claim 1, further comprising separating means for separating said two optical signals having said input wavelengths and said interchanged wavelengths.

25. The method of claim 7, further comprising separating said inputted optical signals from optical signals of interchanged wavelengths produced by said pumping step.

26. The network of claim 21, further comprising separating means attached to outputs of said optical difference frequency generator for separating said optical signals having said interchanged frequencies from those having said first carrier frequencies.

27. The cross-connect of claim 12, wherein said wavelength interchangers comprise optical difference frequency generators.

* * * * *